(12) United States Patent
Petluri et al.

(10) Patent No.: US 10,774,997 B2
(45) Date of Patent: Sep. 15, 2020

(54) COMPOSITIONS FOR LED LIGHT CONVERSIONS

(71) Applicant: EcoSense Lighting, Inc., Los Angeles, CA (US)

(72) Inventors: Raghuram L. V Petluri, Los Angeles, CA (US); Paul Kenneth Pickard, Los Angeles, CA (US)

(73) Assignee: EcoSense Lighting, Inc., Los Angeles, CA (US)

( * ) Notice: Subject to any disclaimer, the term of this patent is extended or adjusted under 35 U.S.C. 154(b) by 0 days.

(21) Appl. No.: 16/048,685

(22) Filed: Jul. 30, 2018

(65) Prior Publication Data

US 2018/0356051 A1    Dec. 13, 2018

Related U.S. Application Data

(63) Continuation of application No. PCT/US2016/015318, filed on Jan. 28, 2016.

(51) Int. Cl.
| | |
|---|---|
| *F21K 9/64* | (2016.01) |
| *F21V 9/30* | (2018.01) |
| *C09K 11/77* | (2006.01) |
| *F21V 3/00* | (2015.01) |
| *F21V 5/04* | (2006.01) |

(Continued)

(52) U.S. Cl.
CPC ............... *F21K 9/64* (2016.08); *C09K 11/02* (2013.01); *C09K 11/0883* (2013.01); *C09K 11/646* (2013.01); *C09K 11/7706* (2013.01); *C09K 11/7721* (2013.01); *C09K 11/7734* (2013.01); *F21V 3/00* (2013.01); *F21V 5/04* (2013.01); *F21V 7/00* (2013.01); *F21V 9/30* (2018.02); *G02B 6/0001* (2013.01); *F21Y 2101/00* (2013.01); *F21Y 2103/10* (2016.08); *F21Y 2113/13* (2016.08); *F21Y 2115/10* (2016.08); *Y02B 20/181* (2013.01)

(58) Field of Classification Search
CPC ..... F21K 9/64; F21V 9/30; F21V 3/00; F21V 5/04; F21V 7/00; G02B 6/0001
See application file for complete search history.

(56) References Cited

U.S. PATENT DOCUMENTS

| 7,858,408 B2 | 12/2010 | Mueller et al. |
|---|---|---|
| 8,058,088 B2 | 11/2011 | Cannon et al. |

(Continued)

FOREIGN PATENT DOCUMENTS

EP    2175007 A1    4/2010

OTHER PUBLICATIONS

International Patent Application No. PCT/US2016/015318; Int'l Search Report and the Written Opinion; dated Apr. 11, 2016; 17 pages.

(Continued)

*Primary Examiner* — Julie A Bannan
*Assistant Examiner* — Michael Chiang
(74) *Attorney, Agent, or Firm* — FisherBroyles LLP

(57) ABSTRACT

Systems and methods to provide multiple channels of light to form a blended white light output, the systems and methods utilizing recipient luminophoric mediums to alter light provided by light emitting diodes. The predetermined blends of luminescent materials within the luminophoric mediums provide predetermined spectral power distributions in the white light output.

18 Claims, 10 Drawing Sheets

(51) Int. Cl.
*F21V 7/00* (2006.01)
*F21V 8/00* (2006.01)
*C09K 11/02* (2006.01)
*C09K 11/08* (2006.01)
*C09K 11/64* (2006.01)
*F21Y 113/13* (2016.01)
*F21Y 101/00* (2016.01)
*F21Y 103/10* (2016.01)
*F21Y 115/10* (2016.01)

(56) References Cited

U.S. PATENT DOCUMENTS

| | | |
|---|---|---|
| 8,118,454 B2 | 2/2012 | Rains, Jr. et al. |
| 8,256,930 B2 | 9/2012 | Cheng et al. |
| 8,399,267 B2 | 3/2013 | Ling |
| 8,449,128 B2 | 5/2013 | Ko et al. |
| 8,508,127 B2 | 8/2013 | Negley et al. |
| 8,556,469 B2 | 10/2013 | Pickard |
| 8,602,579 B2 | 12/2013 | Van de Ven et al. |
| 8,783,901 B2 | 7/2014 | Zoorob et al. |
| 8,884,508 B2 | 11/2014 | Pickard et al. |
| 8,921,875 B2 | 12/2014 | LeToquin et al. |
| 9,012,938 B2 | 4/2015 | Yuan et al. |
| 9,609,715 B1 | 3/2017 | Petluri et al. |
| 9,719,660 B1 | 8/2017 | Petluri et al. |
| 10,465,862 B2 | 11/2019 | Petluri et al. |
| 2006/0132011 A1* | 6/2006 | Shimizu ............ C09K 11/06 313/112 |
| 2007/0096057 A1 | 5/2007 | Hampden-Smith et al. |
| 2008/0224598 A1 | 9/2008 | Baretz et al. |
| 2008/0265269 A1 | 10/2008 | Yoo et al. |
| 2011/0031894 A1 | 2/2011 | Van De Ven |
| 2011/0273079 A1 | 11/2011 | Pickard et al. |
| 2012/0212123 A1 | 8/2012 | Sakuta et al. |
| 2012/0223657 A1* | 9/2012 | Van de Ven ....... H05B 33/0827 315/297 |
| 2013/0021775 A1 | 1/2013 | Veerasamy et al. |
| 2013/0056765 A1 | 3/2013 | Thompson et al. |
| 2013/0070441 A1 | 3/2013 | Moon et al. |
| 2013/0070442 A1 | 3/2013 | Negley |
| 2013/0140490 A1 | 6/2013 | Fujinaga et al. |
| 2013/0207130 A1 | 8/2013 | Reiherzer |
| 2013/0264947 A1 | 10/2013 | Ouderkirk et al. |
| 2014/0048743 A1 | 2/2014 | Le-Mercier et al. |
| 2014/0063779 A1 | 3/2014 | Bradford |
| 2014/0268728 A1 | 9/2014 | Hussell et al. |
| 2014/0312376 A1 | 10/2014 | Wilcox et al. |
| 2015/0062892 A1 | 3/2015 | Krames et al. |
| 2015/0295144 A1 | 10/2015 | Weiler et al. |
| 2017/0309795 A1* | 10/2017 | Kim ............... C09K 11/0883 |
| 2018/0363860 A1 | 12/2018 | Kasugai et al. |

OTHER PUBLICATIONS

International Patent Application No. PCT/US2016/015318; Int'l Preliminary Report on Patentability; dated Aug. 9, 2018; 15 pages.
Kijima, "Phosphors for Solid-State Lightning. New Green and Red Phosphors", Business Through Innovation, Mitsubishi Chemical Group Science and Technology Research Center Inc., Phosphor Global Summit 2007, Mar. 5-7, 2007; 41 pages.
"Considerations for Blending LED Phosphors"; Applications Note; Intematix; www.intematix.com; Jan. 2013; 8 pages.
"Phosphor component Materials"; Mitsubishi Chemical Corporation; Jun. 2013; 13 pages.
Oh et al. "Healthy, natural, efficient and tunable lighting: four-package white LEDs for optimizing the circadian effect, color quality and vision performance"; Light: Science & Applications; vol. 3; 2014; 21 pages.
Xu et al. "A bright future for color-controlled solid state lighting"; J Mater Sci: Mater Electron; Apr. 2015; 6 pages.
Yang et al. "Precise Simulation of Spectrum for Green Emitting Phosphors Pumped by a Blue LED Die"; IEEE Photonics Journal; vol. 6 Issue 4; Aug. 2014; 11 pages.
Tuite, "Blend Blue LEDs and Phosphors to Make HB LEDs", Engineering Essentials; May 2013; p. 42-44.
"Considerations for Encapsulant Material Selection for Phosphor-Converted LEDs" ; Application Note; Intematix; www.intematix.com, Dec. 2011; 8 pages.
"LuAG:Ce Scintillation Material"; Crytur Ltd. www.crytur.com.; 1 page.
"NYAG4355-L"; Datasheet; Intematix; www.intematix.com.; 1 page.
"Flexible Phosphor Sheet"; www.phosphortech.com; Datasheet; Phosphortech Corporation; Aug. 2014; 10 pages.
Lockley et al., "High sensitivity of the human circadian melatonin rhythm to resetting by short wavelength light" Apollo Health; J Clin Endocrinol Metab.; vol. 88(9); Sep. 2003; p. 4502-4505; abstract only.
West et al., "Blue light from light-emitting diodes elicits a dose-dependent suppression of melatonin in humans", J. Appl Physiol; vol. 110; Mar. 2011; 8 pages.
Figueiro et al. "Spectral Sensitivity of the Circadian System", Lighting Research Center; Rensselaer Polytechnic Institute; 8 pages.
Thapan et al. "An action spectrum for melatonin suppression: evidence for a novel non-rod, non-cone photoreceptor system in humans"; Journal of Physiology; vol. 535.1; 2001; p. 261-267.
Koka; "Overcome major LED-lighting design challenges with molded plastics (Magazine)"; LEDs Magazine; Mar. 2015; 8 pages.

* cited by examiner

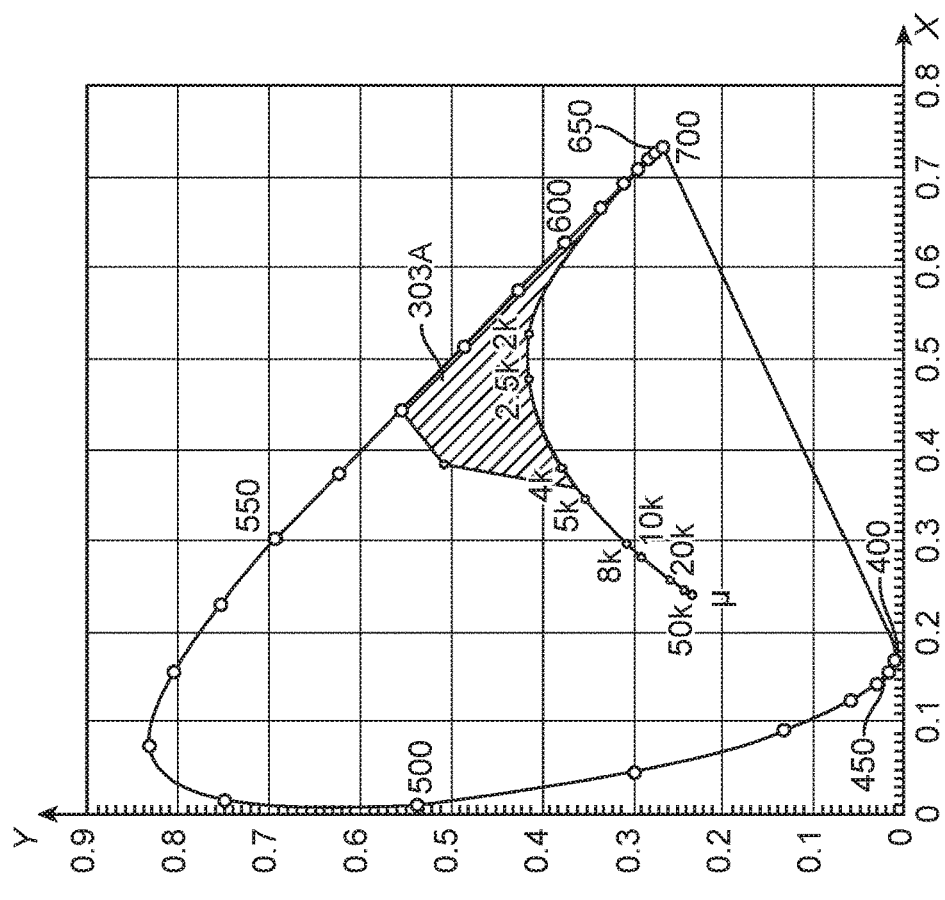
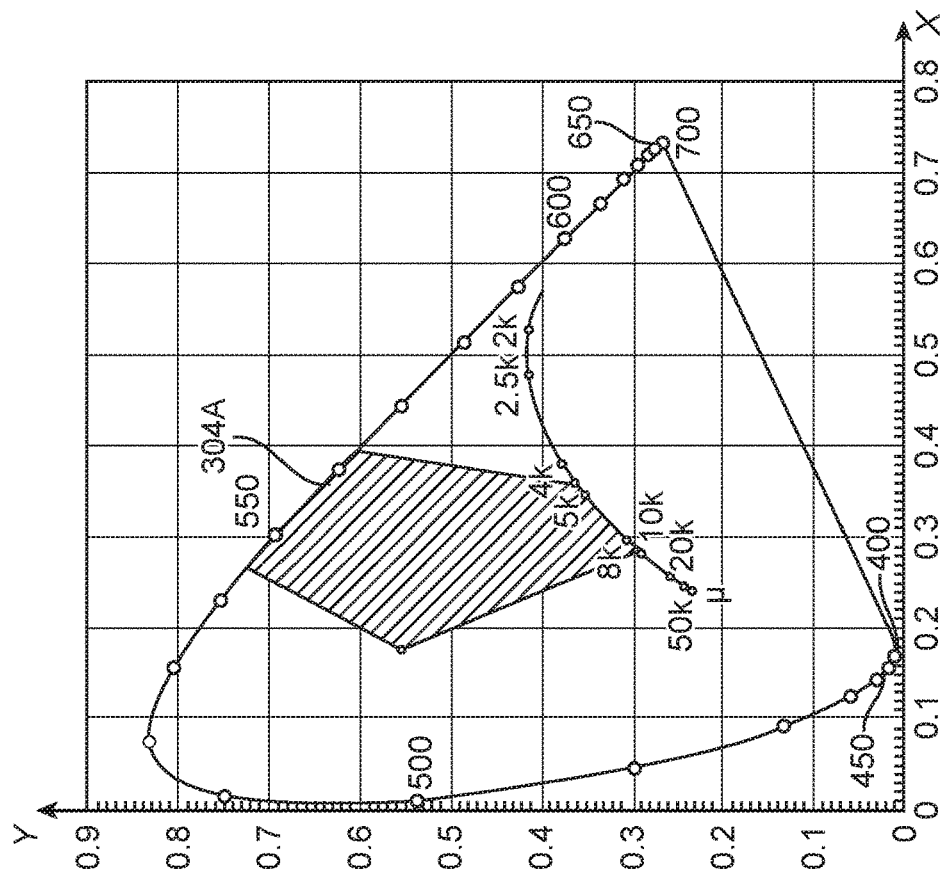
FIG. 4A
FIG. 4B

FIG. 7

| | Spectral Power Distribution for Wavelength Ranges (nm) | | | | | | | | | |
|---|---|---|---|---|---|---|---|---|---|---|
| | 380-420 | 421-460 | 461-500 | 501-540 | 541-580 | 581-620 | 621-660 | 661-700 | 701-740 | 741-780 |
| blue color range | | | | | | | | | | |
| min | 0.3 | 100.0 | 20.9 | 15.2 | 25.3 | 26.3 | 15.4 | 5.9 | 2.3 | 1.0 |
| max | 8.1 | 100.0 | 196.1 | 35.6 | 40.5 | 70.0 | 80.2 | 20.4 | 7.8 | 2.3 |
| red color range | | | | | | | | | | |
| min | 0.0 | 2.1 | 2.0 | 1.4 | 8.7 | 48.5 | 100.0 | 1.8 | 0.5 | 0.3 |
| max | 14.8 | 157.8 | 6.7 | 12.2 | 20.5 | 102.8 | 100.0 | 74.3 | 29.5 | 9.0 |
| yellow/green color range | | | | | | | | | | |
| min | 0.0 | 1.0 | 4.2 | 56.6 | 100.0 | 80.5 | 48.4 | 12.6 | 3.2 | 1.0 |
| max | 1.1 | 25.3 | 52.7 | 77.5 | 100.0 | 123.4 | 144.9 | 88.8 | 34.4 | 10.5 |
| cyan color range | | | | | | | | | | |
| min | 0.1 | 0.5 | 39.6 | 100.0 | 62.0 | 41.6 | 23.1 | 6.6 | 1.8 | 0.6 |
| max | 0.7 | 1.6 | 58.6 | 100.0 | 80.4 | 59.9 | 57.1 | 35.0 | 13.5 | 4.1 |

FIG. 8

| | Spectral Power Distribution for Wavelength Ranges (nm) | | | | |
|---|---|---|---|---|---|
| | 380-500 | 501-600 | 601-700 | 701-780 | |
| blue color range | | | | | |
| min | 100.0 | 27.0 | 24.8 | 1.1 | |
| max | 100.0 | 65.1 | 46.4 | 6.8 | |
| red color range | | | | | |
| min | 17.4 | 8.9 | 100.0 | 1.1 | |
| max | 3.3 | 24.8 | 100.0 | 18.1 | |
| yellow/green color range | | | | | |
| min | 35.8 | 100.0 | 61.2 | 7.9 | |
| max | 2.4 | 100.0 | 142.0 | 21.1 | |
| cyan color range | | | | | |
| min | 32.2 | 100.0 | 14.7 | 1.3 | |
| max | 19.9 | 100.0 | 42.4 | 6.1 | |

FIG. 9

| Part Number | Bin | Dominant/Peak wavelength (nm) | |
|---|---|---|---|
| | | Minimum | Maximum |
| LXZ1-PB01 | 1 | 460 | 465 |
| | 2 | 465 | 470 |
| | 5 | 480 | 485 |
| LXZ1-PR01 | 3 | 440 | 445 |
| | 4 | 445 | 450 |
| | 5 | 450 | 455 |
| | 6 | 455 | 460 |
| LXZ1-PE01 | 1 | 490 | 498 |
| | 2 | 498 | 508 |
| | 6 | 490 | 495 |
| | 7 | 495 | 500 |
| | 8 | 500 | 505 |
| | 9 | 505 | 510 |

COMPOSITIONS FOR LED LIGHT CONVERSIONS

CROSS-REFERENCE TO RELATED APPLICATIONS

This application is a continuation of International Patent Application no. PCT/US2016/015318 filed Jan. 28, 2016, the contents of which are incorporated by reference as if fully set forth herein.

FIELD

This disclosure is in the field of solid-state lighting. In particular, the disclosure relates to luminophoric compositions for use in methods of generating white light.

BACKGROUND

A wide variety of light emitting devices are known in the art including, for example, incandescent light bulbs, fluorescent lights, and semiconductor light emitting devices such as light emitting diodes ("LEDs").

There are a variety of resources utilized to describe the light produced from a light emitting device, one commonly used resource is 1931 CIE (Commission Internationale de l'Éclairage) Chromaticity Diagram. The 1931 CIE Chromaticity Diagram maps out the human color perception in terms of two CIE parameters x and y. The spectral colors are distributed around the edge of the outlined space, which includes all of the hues perceived by the human eye. The boundary line represents maximum saturation for the spectral colors, and the interior portion represents less saturated colors including white light. The diagram also depicts the Planckian locus, also referred to as the black body locus (BBL), with correlated color temperatures, which represents the chromaticity coordinates (i.e., color points) that correspond to radiation from a black-body at different temperatures. Illuminants that produce light on or near the BBL can thus be described in terms of their correlated color temperatures (CCT). These illuminants yield pleasing "white light" to human observers, with general illumination typically utilizing CCT values between 1,800K and 10,000K.

Color rendering index (CRI) is described as an indication of the vibrancy of the color of light being produced by a light source. In practical terms, the CRI is a relative measure of the shift in surface color of an object when lit by a particular lamp as compared to a reference light source, typically either a black-body radiator or the daylight spectrum. The higher the CRI value for a particular light source, the better that the light source renders the colors of various objects it is used to illuminate.

LEDs have the potential to exhibit very high power efficiencies relative to conventional incandescent or fluorescent lights. Most LEDs are substantially monochromatic light sources that appear to emit light having a single color. Thus, the spectral power distribution of the light emitted by most LEDs is tightly centered about a "peak" wavelength, which is the single wavelength where the spectral power distribution or "emission spectrum" of the LED reaches its maximum as detected by a photo-detector. LEDs typically have a full-width half-maximum wavelength range of about 10 nm to 30 nm, comparatively narrow with respect to the broad range of visible light to the human eye, which ranges from approximately from 380 nm to 800 nm.

In order to use LEDs to generate white light, LED lamps have been provided that include two or more LEDs that each emit a light of a different color. The different colors combine to produce a desired intensity and/or color of white light. For example, by simultaneously energizing red, green and blue LEDs, the resulting combined light may appear white, or nearly white, depending on, for example, the relative intensities, peak wavelengths and spectral power distributions of the source red, green and blue LEDs. The aggregate emissions from red, green, and blue LEDs typically provide poor CRI for general illumination applications due to the gaps in the spectral power distribution in regions remote from the peak wavelengths of the LEDs.

White light may also be produced by utilizing one or more luminescent materials such as phosphors to convert some of the light emitted by one or more LEDs to light of one or more other colors. The combination of the light emitted by the LEDs that is not converted by the luminescent material(s) and the light of other colors that are emitted by the luminescent material(s) may produce a white or near-white light.

LED lamps have been provided that can emit white light with different CCT values within a range. Such lamps utilize two or more LEDs, with or without luminescent materials, with respective drive currents that are increased or decreased to increase or decrease the amount of light emitted by each LED. By controllably altering the power to the various LEDs in the lamp, the overall light emitted can be tuned to different CCT values. The range of CCT values that can be provided with adequate CRI values and efficiency is limited by the selection of LEDs.

The spectral profiles of light emitted by white artificial lighting can impact circadian physiology, alertness, and cognitive performance levels. Bright artificial light can be used in a number of therapeutic applications, such as in the treatment of seasonal affective disorder (SAD), certain sleep problems, depression, jet lag, sleep disturbances in those with Parkinson's disease, the health consequences associated with shift work, and the resetting of the human circadian clock. Artificial lighting may change natural processes, interfere with melatonin production, or disrupt the circadian rhythm. Blue light may have a greater tendency than other colored light to affect living organisms through the disruption of their biological processes which can rely upon natural cycles of daylight and darkness. Consequently, exposure to blue light late in the evening and at night may be detrimental to one's health.

Significant challenges remain in providing LED lamps that can provide white light across a range of CCT values while simultaneously achieving high efficiencies, high luminous flux, good color rendering, and acceptable color stability. It is also a challenge to provide lighting apparatuses that can provide desirable lighting performance while allowing for the control of circadian energy performance.

It is therefore a desideratum to provide compositions for converting light generated by LEDs into white light with desirable spectral characteristics.

DISCLOSURE

Disclosed herein are aspects of compositions for use in generating white light, the compositions comprising a plurality of luminescent materials and a matrix material formed in a volumetric ratio. The plurality of luminescent materials can comprise one or more of a first type of luminescent material that emits light at a peak emission between about 515 nm and 590 nm in response to the associated LED string emission, and one or more of a second type of luminescent material that emits light at a peak emission between about 590 nm and about 700 nm in response to the associated LED string emission. In some implementations, the one or more of the first type of luminescent materials comprise $BaMgAl_{10}O_{17}:Eu$, $Lu_3Al_5O_{12}:Ce$, $(La,Y)_3Si_6N_{11}:Ce$, or $Y_3Al_5O_{12}:Ce$. In some implementations, the one or more of the second type of luminescent materials comprise $CaAlSiN_3:Eu$, $(Sr,Ca)AlSiN_3$, or one or more semiconductor quantum dots. In some implementations the compositions are configured to be excited by LEDs that emit substantially saturated light at wavelengths between about 360 nm and about 535 nm to produce light having color points within the suitable blue color ranges 301A-C, red color ranges 302A-C, yellow/green color ranges 303A-C, and cyan color ranges 304A-C disclosed herein. In some instances the compositions are configured so that the light emitted by the LED(s) and associated compositions together have spectral power distributions ("SPD") having spectral power with ratios of power across the visible wavelength spectrum that fall within the ranges disclosed herein in FIGS. 7 and 8.

Disclosed herein are aspects of methods of generating white light, the methods comprising passing light from a first LED string through a first luminophoric medium comprised of one or more luminescent materials and matrix in a first ratio for a first combined light in a blue color range on 1931 CIE diagram, passing light from a second LED string through a second luminophoric medium comprised of one or more luminescent materials and matrix in a second ratio for a second combined light in a red color range on 1931 CIE diagram, passing light from a third LED string through a third luminophoric medium comprised of one or more luminescent materials and matrix in a third ratio for a third combined light in a yellow/green color range on 1931 CIE diagram, passing light from a fourth LED string through a fourth luminophoric medium comprised of one or more luminescent materials and matrix in a fourth ratio for a fourth combined light in a cyan color range on 1931 CIE diagram, and mixing the first, second, third, and fourth combined light together. In some implementations the blue color range comprises one of regions 301A, 301B, or 301C, the red color range comprises one of regions 302A, 302B, or 302C, the yellow/green color range comprises one of regions 303A, 303B, or 303C, and the cyan color range comprises one of regions 304A, 304B, or 304C. In some instances, the first, second, third, and fourth combined lights can have spectral power distributions ("SPD") having spectral power with ratios of power across the visible wavelength spectrum that fall within the ranges disclosed herein in FIGS. 7 and 8. In some implementations of the methods, the luminescent materials within each of the first, second, third, and fourth luminophoric mediums comprise one or more of a first type of luminescent material that emits light at a peak emission between about 515 nm and 590 nm in response to the associated LED string emission, and one or more of a second type of luminescent material that emits light at a peak emission between about 590 nm and about 700 nm in response to the associated LED string emission. In some implementations, the one or more of the first type of luminescent materials can comprise BaMgAl10O17:Eu, Lu3Al5O12:Ce, (La,Y)3Si6N11:Ce, or Y3Al5O12:Ce and the one or more of the second type of luminescent materials can comprise $CaAlSiN_3:Eu$, (Sr,Ca)AlSiN3, or a semiconductor quantum dot.

The general disclosure and the following further disclosure are exemplary and explanatory only and are not restrictive of the disclosure, as defined in the appended claims. Other aspects of the present disclosure will be apparent to those skilled in the art in view of the details as provided herein. In the figures, like reference numerals designate corresponding parts throughout the different views. All callouts and annotations are hereby incorporated by this reference as if fully set forth herein.

DRAWINGS

The disclosure, as well as the following further disclosure, is best understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings:

FIGS. 4A-4D illustrate some aspects of light emitting devices according to the present disclosure, including some suitable color ranges for light generated by components of the devices;

FIGS. 7-8 are tables of data of relative spectral power versus wavelength regions for some suitable color points of light generated by components of devices of the present disclosure; and FIG. 9 is a table of data of light output of light emitting diodes suitable for implementations of the present disclosure.

Figure 1:
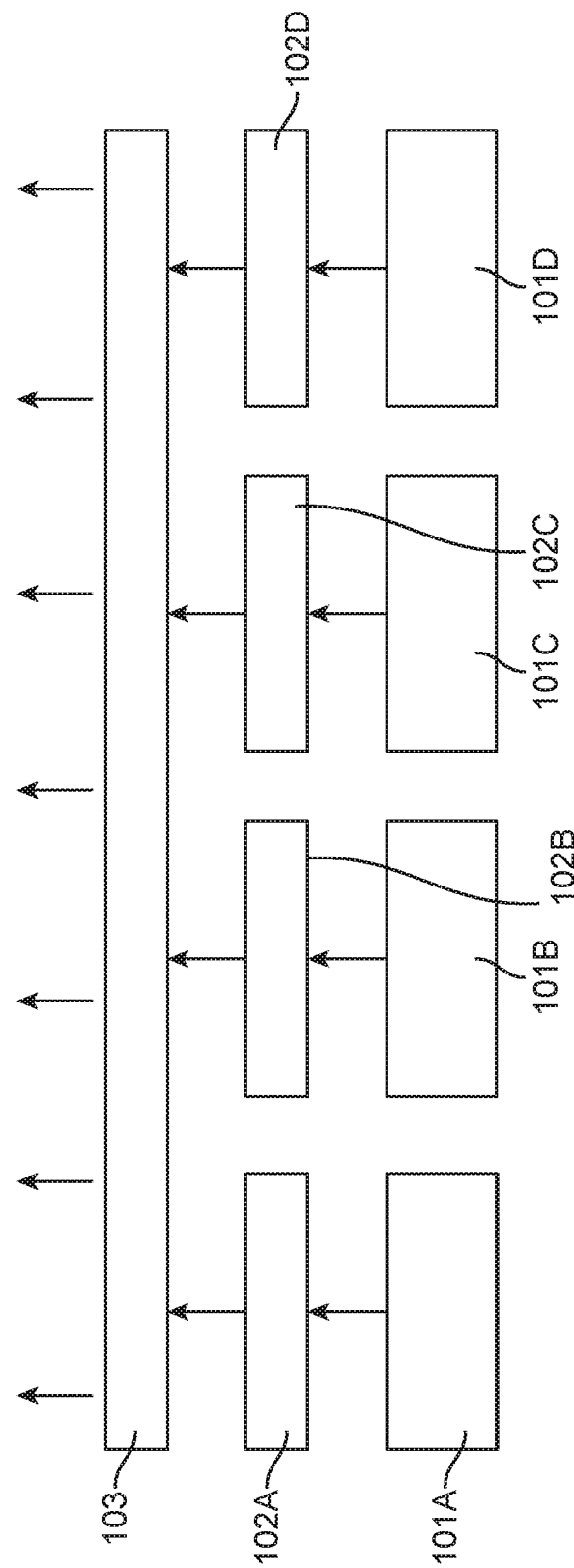
FIG. 1 illustrates aspects of light emitting devices according to the present disclosure.

The general disclosure and the following further disclosure are exemplary and explanatory only and are not restrictive of the disclosure, as defined in the appended claims. Other aspects of the present disclosure will be apparent to those skilled in the art in view of the details as provided herein. In the figures, like reference numerals designate corresponding parts throughout the different views. All callouts and annotations are hereby incorporated by this reference as if fully set forth herein.

FURTHER DISCLOSURE

Light emitting diode (LED) illumination has a plethora of advantages over incandescent to fluorescent illumination. Advantages include longevity, low energy consumption, and small size. White light is produced from a combination of LEDs utilizing phosphors to convert the wavelengths of light produced by the LED into a preselected wavelength or range of wavelengths.

In one aspect, the present disclosure provides semiconductor light emitting devices 100 that can have a plurality of light emitting diode (LED) strings. Each LED string can have one, or more than one, LED. As depicted schematically in FIG. 1, the device 100 may comprise one or more LED strings (101A/101B/101C/101D) that emit light (schematically shown with arrows). In some instances, the LED strings can have recipient luminophoric mediums (102A/102B/102C/102D) associated therewith. The light emitted from the LED strings, combined with light emitted from the recipient luminophoric mediums, can be passed through one or more optical elements 103. Optical elements 103 may be one or more diffusers, lenses, light guides, reflective elements, or combinations thereof.

A recipient luminophoric medium 102A, 102B, 102C, or 102D includes one or more luminescent materials and is positioned to receive light that is emitted by an LED or other semiconductor light emitting device. In some implementations, recipient luminophoric mediums include layers having luminescent materials that are coated or sprayed directly onto a semiconductor light emitting device or on surfaces of the packaging thereof, and clear encapsulants that include luminescent materials that are arranged to partially or fully cover a semiconductor light emitting device. A recipient luminophoric medium may include one medium layer or the like in which one or more luminescent materials are mixed, multiple stacked layers or mediums, each of which may include one or more of the same or different luminescent materials, and/or multiple spaced apart layers or mediums, each of which may include the same or different luminescent materials. Suitable encapsulants are known by those skilled in the art and have suitable optical, mechanical, chemical, and thermal characteristics. In some implementations, encapsulants can include dimethyl silicone, phenyl silicone, epoxies, acrylics, and polycarbonates. In some implementations, a recipient luminophoric medium can be spatially separated (i.e., remotely located) from an LED or surfaces of the packaging thereof, with luminescent materials disposed within a matrix material. The matrix material can be any material capable of retaining luminescent materials and capable of allowing light to pass through it. In some implementations, such spatial segregation may involve separation of a distance of at least about 1 mm, at least about 2 mm, at least about 5 mm, or at least about 10 mm. In certain embodiments, conductive thermal communication between a spatially segregated luminophoric medium and one or more electrically activated emitters is not substantial. Luminescent materials can include phosphors, scintillators, day glow tapes, nanophosphors, inks that glow in visible spectrum upon illumination with light, semiconductor quantum dots, or combinations thereof.

Figure 2:
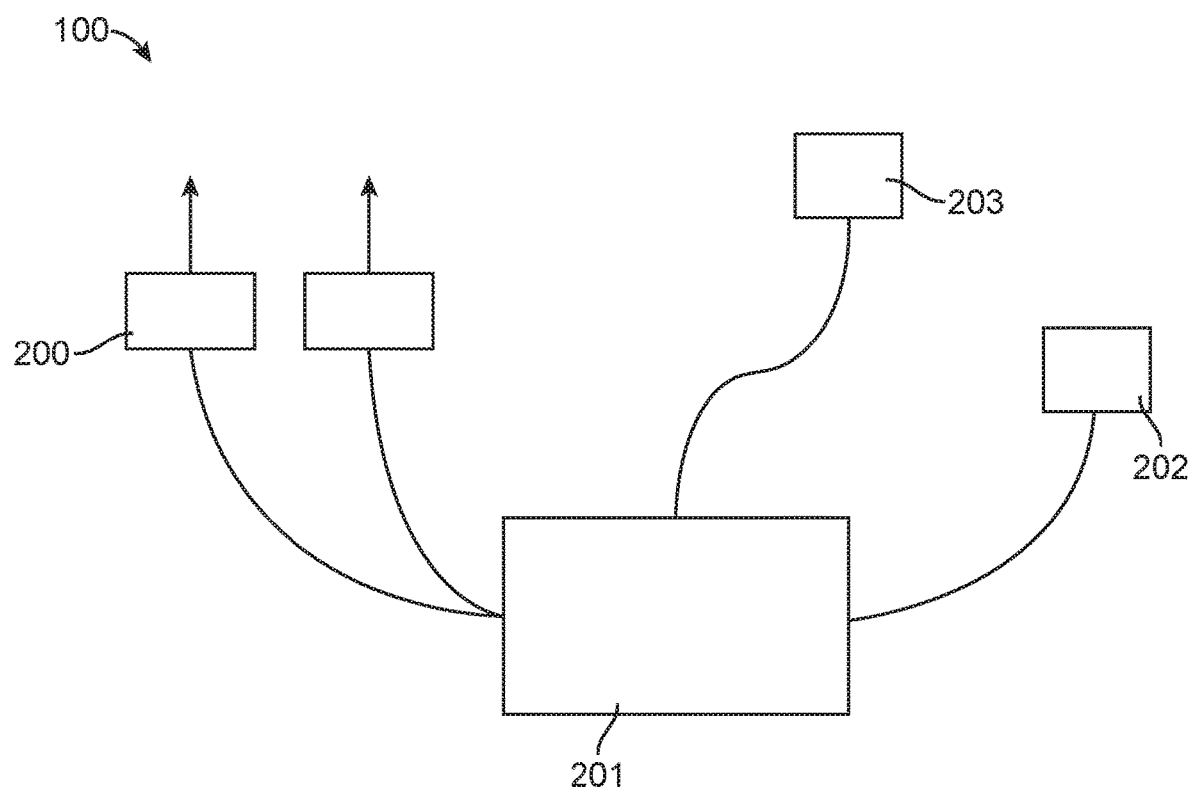
FIG. 2 illustrates aspects of light emitting devices according to the present disclosure.

As depicted schematically in FIG. 2, multiple solid state packages 200 may be arranged in a single semiconductor light emitting device 100. Individual solid state emitter packages or groups of solid state emitter packages (e.g., wired in series) may be separately controlled. Separate control of individual emitters, groups of emitters, individual packages, or groups of packages, may be provided by independently applying drive currents to the relevant components with control elements known to those skilled in the art. In one embodiment, at least one control circuit 201a may include a current supply circuit configured to independently apply an on-state drive current to each individual solid state emitter, group of solid state emitters, individual solid state emitter package, or group of solid state emitter packages. Such control may be responsive to a control signal (optionally including at least one sensor 202 arranged to sense electrical, optical, and/or thermal properties and/or environmental conditions), and a control system 203 may be configured to selectively provide one or more control signals to the at least one current supply circuit. In various embodiments, current to different circuits or circuit portions may be pre-set, user-defined, or responsive to one or more inputs or other control parameters. The design and fabrication of semiconductor light emitting devices are well known to those skilled in the art, and hence further description thereof will be omitted.

Figure 3:
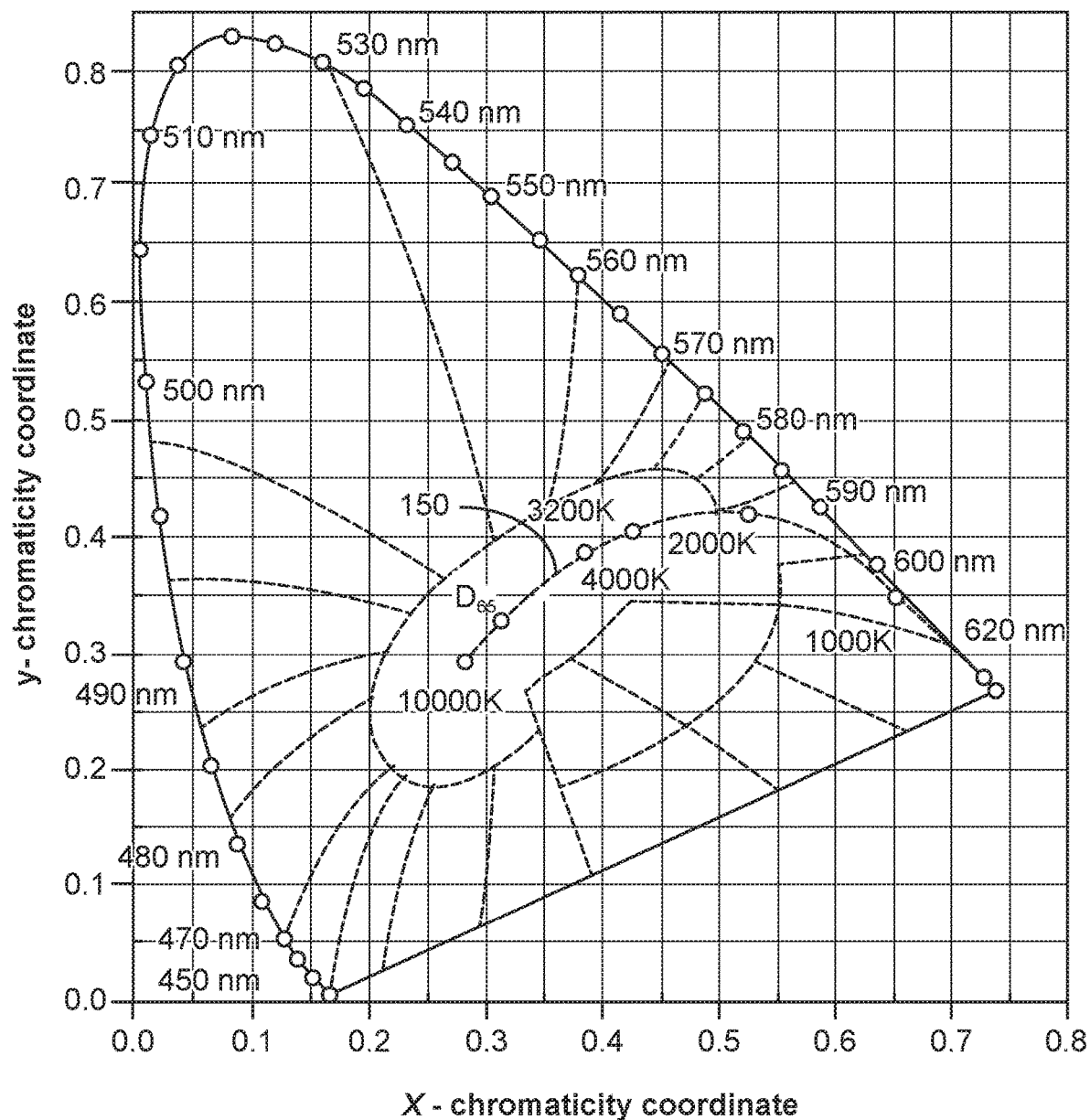
FIG. 3 depicts a graph of a 1931 CIE Chromaticity Diagram illustrating the location of the Planckian locus.

FIG. 3 illustrates a 1931 International Commission on Illumination (CIE) chromaticity diagram. The 1931 CIE Chromaticity diagram is a two-dimensional chromaticity space in which every visible color is represented by a point having x- and y-coordinates. Fully saturated (monochromatic) colors appear on the outer edge of the diagram, while less saturated colors (which represent a combination of wavelengths) appear on the interior of the diagram. The term "saturated", as used herein, means having a purity of at least 85%, the term "purity" having a well-known meaning to persons skilled in the art, and procedures for calculating purity being well-known to those of skill in the art. The Planckian locus, or black body locus (BBL), represented by line 150 on the diagram, follows the color an incandescent black body would take in the chromaticity space as the temperature of the black body changes from about 1000K to 10,000 K. The black body locus goes from deep red at low temperatures (about 1000 K) through orange, yellowish white, white, and finally bluish white at very high temperatures. The temperature of a black body radiator corresponding to a particular color in a chromaticity space is referred to as the "correlated color temperature." In general, light corresponding to a correlated color temperature (CCT) of about 2700 K to about 6500 K is considered to be "white" light. In particular, as used herein, "white light" generally refers to light having a chromaticity point that is within a 10-step MacAdam ellipse of a point on the black body locus having a CCT between 2700K and 6500K. However, it will be understood that tighter or looser definitions of white light can be used if desired. For example, white light can refer to light having a chromaticity point that is within a seven step MacAdam ellipse of a point on the black body locus having a CCT between 2700K and 6500K. The distance from the black body locus can be measured in the CIE 1960 chromaticity diagram, and is indicated by the symbol Δuv, or DUV. If the chromaticity point is above the Planckian locus the DUV is denoted by a positive number; if the chromaticity point is below the locus, DUV is indicated with a negative number. If the DUV is sufficiently positive, the light source may appear greenish or yellowish at the same CCT. If the DUV is sufficiently negative, the light source can appear to be purple or pinkish at the same CCT. Observers may prefer light above or below the Planckian locus for particular CCT values. DUV calculation methods are well known by those of ordinary skill in the art and are more fully described in ANSI C78.377, American National Standard for Electric Lamps—Specifications for the Chromaticity of Solid State Lighting (SSL) Products, which is incorporated by reference herein in its entirety for all purposes. A point representing the CIE Standard Illuminant D65 is also shown on the diagram. The D65 illuminant is intended to represent average daylight and has a CCT of approximately 6500K and the spectral power distribution is described more fully in Joint ISO/CIE Standard, ISO 10526:1999/CIE 5005/E-1998, CIE Standard Illuminants for Colorimetry, which is incorporated by reference herein in its entirety for all purposes.

The light emitted by a light source may be represented by a point on a chromaticity diagram, such as the 1931 CIE chromaticity diagram, having color coordinates denoted (ccx, ccy) on the X-Y axes of the diagram. A region on a chromaticity diagram may represent light sources having similar chromaticity coordinates.

In some exemplary implementations, the present disclosure provides semiconductor light emitting devices 100 that include a plurality of LED strings, with each LED string having a recipient luminophoric medium that comprises a luminescent material. The LED(s) in each string and the luminophoric medium in each string together emit an unsaturated light having a color point within a color range in the 1931 CIE chromaticity diagram. A "color range" in the 1931 CIE chromaticity diagram refers to a bounded area defining a group of color coordinates (ccx, ccy).

In some implementations, four LED strings (101A/101B/101C/101D) are present in a device 100, and the LED strings can have recipient luminophoric mediums (102A/102B/102C/102D). A first LED string 101A and a first luminophoric medium 102A together can emit a first light having a first color point within a blue color range. The combination of the first LED string 101A and the first luminophoric medium 102A are also referred to herein as a "blue channel." A second LED string 101B and a second luminophoric medium 102B together can emit a second light having a second color point within a red color range. The combination of the second LED string 101A and the second luminophoric medium 102A are also referred to herein as a "red channel." A third LED string 101C and a third luminophoric medium 102C together can emit a third light having a third color point within a yellow/green color range. The combination of the third LED string 101A and the third luminophoric medium 102A are also referred to herein as a "yellow/green channel." A fourth LED string 101D and a fourth luminophoric medium 102D together can emit a fourth light having a fourth color point within a cyan color range. The combination of the fourth LED string 101A and the fourth luminophoric medium 102A are also referred to herein as a "cyan channel." The first, second, third, and fourth LED strings 101A/101B/101C/101D can be provided with independently applied on-state drive currents in order to tune the intensity of the first, second, third, and fourth unsaturated light produced by each string and luminophoric medium together. By varying the drive currents in a controlled manner, the color coordinate (ccx, ccy) of the total light that is emitted from the device 100 can be tuned. In some implementations, the device 100 can provide light at substantially the same color coordinate with different spectral power distribution profiles, which can result in different light characteristics at the same CCT. In some implementations, white light can be generated in modes that only produce light from two or three of the LED strings. In one implementation, white light is generated using only the first, second, and third LED strings, i.e. the blue, red, and yellow/green channels. In another implementation, white light is generated using only the first, second, and fourth LED strings, i.e., the blue, red, and cyan channels. In some implementations, only two of the LED strings are producing light during the generation of white light, as the other two LED strings are not necessary to generate white light at the desired color point with the desired color rendering performance.

Figure 4D:
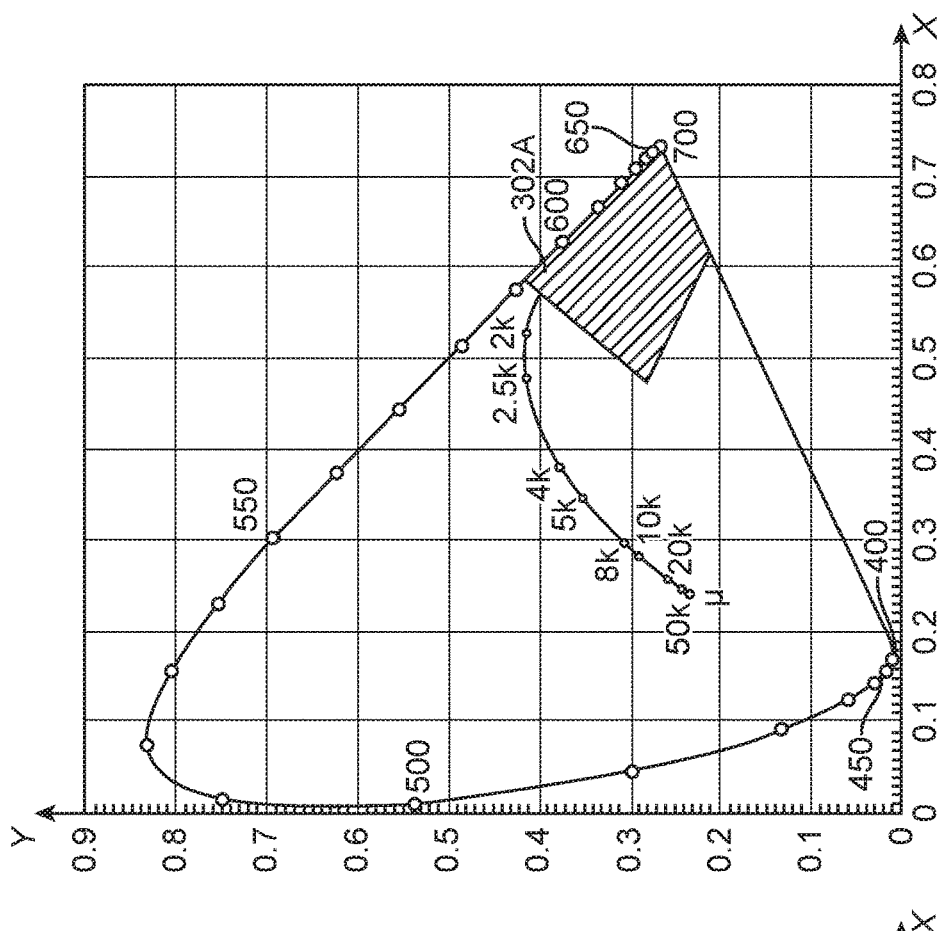
Figure 4C:
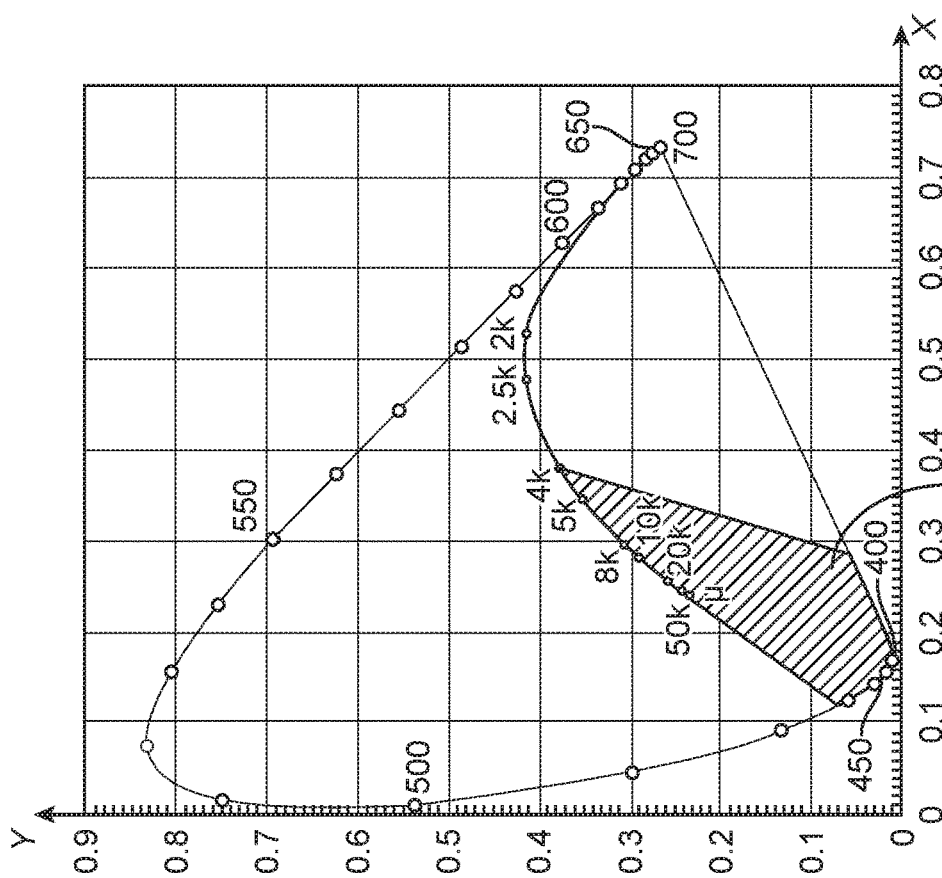

FIGS. 4A, 4B, 4C, and 4D depict suitable color ranges for some implementations of the disclosure. FIG. 4A depicts a cyan color range 304A defined by a line connecting the ccx, ccy color coordinates (0.18, 0.55) and (0.27, 0.72), the constant CCT line of 9000K, the Planckian locus between 9000K and 4600K, the constant CCT line of 4600K, and the spectral locus. FIG. 4B depicts a yellow/green color range 303A defined by the constant CCT line of 4600K, the Planckian locus between 4600K and 550K, the spectral locus, and a line connecting the ccx, ccy color coordinates (0.445, 0.555) and (0.38, 0.505). FIG. 4C depicts a blue color range 301A defined by a line connecting the ccx, ccy color coordinates of the infinity point of the Planckian locus (0.242, 0.24) and (0.12, 0.068), the Planckian locus from 4000K and infinite CCT, the constant CCT line of 4000K, the line of purples, and the spectral locus. FIG. 4D depicts a red color range 302A defined by the spectral locus between the constant CCT line of 1600K and the line of purples, the line of purples, a line connecting the ccx, ccy color coordinates (0.61, 0.21) and (0.47, 0.28), and the constant CCT line of 1600K. It should be understood that any gaps or openings in the described boundaries for the color ranges 301A, 302A, 303A, 304A should be closed with straight lines to connect adjacent endpoints in order to define a closed boundary for each color range.

Figure 5:
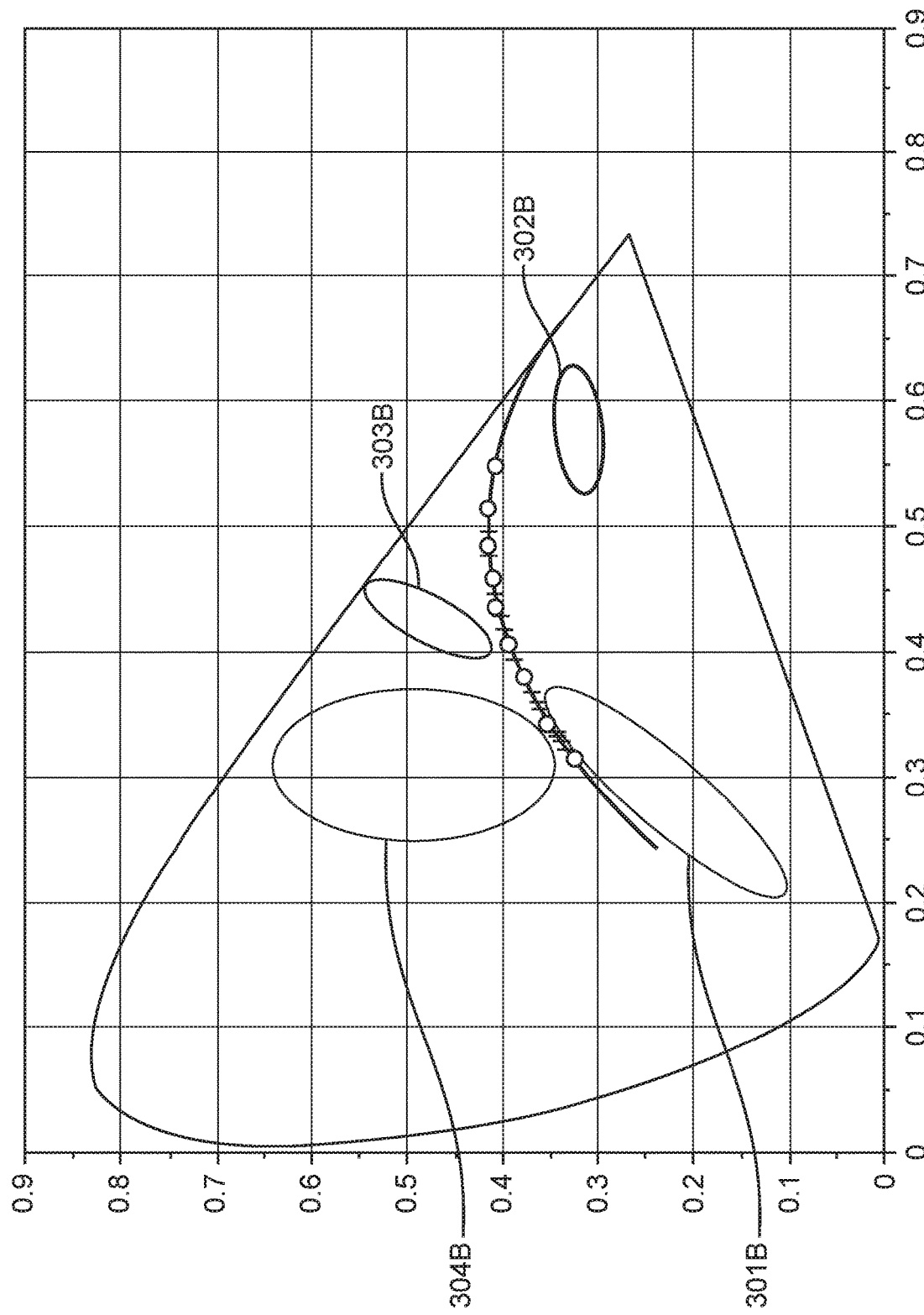
FIG. 5 illustrates some aspects of light emitting devices according to the present disclosure, including some suitable color ranges for light generated by components of the devices.
Figure 6:
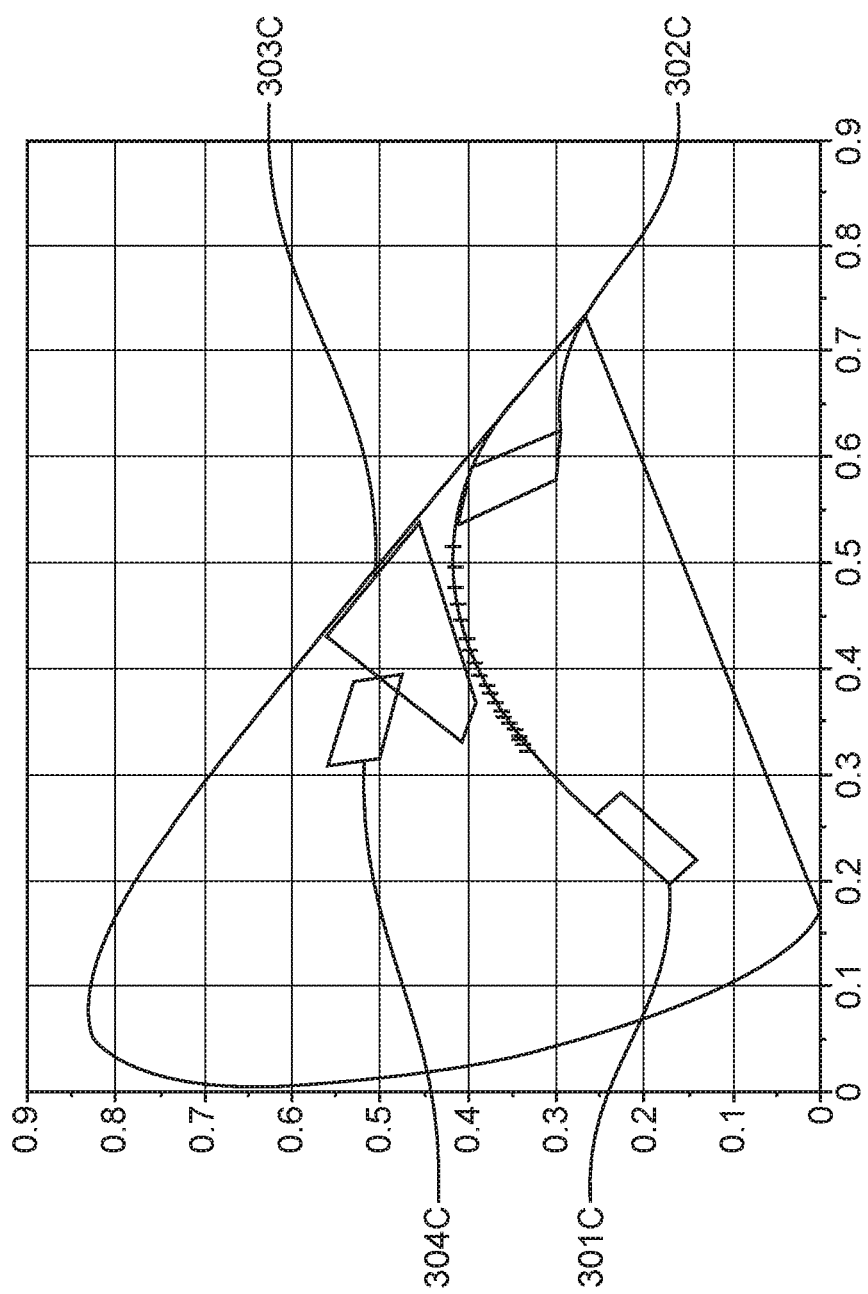
FIG. 6 illustrates some aspects of light emitting devices according to the present disclosure, including some suitable color ranges for light generated by components of the devices.

In some implementations, suitable color ranges can be narrower than those depicted in FIGS. 4A-4D. FIG. 5 depicts some suitable color ranges for some implementations of the disclosure. A blue color range 301B can be defined by a 60-step MacAdam ellipse at a CCT of 20000K, 40 points below the Planckian locus. A red color range 302B can be defined by a 20-step MacAdam ellipse at a CCT of 1200K, 20 points below the Planckian locus. A yellow/green color range 303B can be defined by a 16-step MacAdam ellipse at a CCT of 3700K, 30 points above Planckian locus. A cyan color range 304B can be defined by 30-step MacAdam ellipse at a CCT of 6000K, 68 points above the Planckian locus. FIG. 6 depicts some further color ranges suitable for some implementations of the disclosure: blue color range 301C, red color range 302C, yellow/green color range 303C, and cyan color range 304C.

In some implementations, the LEDs in the first, second, third and fourth LED strings can be LEDs with peak emission wavelengths at or below about 535 nm. In some implementations, the LEDs emit light with peak emission wavelengths between about 360 nm and about 535 nm. In some implementations, the LEDs in the first, second, third and fourth LED strings can be formed from InGaN semiconductor materials. In some preferred implementations, the first, second, and third LED strings can have LEDs having a peak wavelength between about 405 nm and about 485 nm. In some implementations the fourth LED string can have LEDs having a peak wavelength between about 485 nm and about 520 nm. The LEDs used in the first, second, third, and fourth LED strings may have full-width half-maximum wavelength ranges of between about 10 nm and about 30 nm. In some preferred implementations, the first, second, and third LED strings can include one or more LUXEON Z Color Line royal blue LEDs (product code LXZ1-PR01) of color bin codes 3, 4, 5, or 6 or one or more LUXEON Z Color Line blue LEDs (LXZ1-PB01) of color bin code 1 or 2 (Lumileds Holding B.V., Amsterdam, Netherlands). In some preferred implementations, the fourth LED string can have one or more LUXEON Z Color Line blue LEDs (LXZ1-PB01) of color bin code 5 or one or more LUXEON Z Color Line cyan LEDs (LXZ1-PE01) color bin code 1, 2, 6, 7, 8, or 9 (Lumileds Holding B.V., Amsterdam, Netherlands). The wavelength information for these color bins is provided in the table in FIG. 9. Similar LEDs from other manufacturers such as OSRAM GmbH and Cree, Inc. could also be used, provided they have peak emission and full-width half-maximum wavelengths of the appropriate values.

In implementations utilizing LEDs that emit substantially saturated light at wavelengths between about 360 nm and about 535 nm, the device 100 can include suitable recipient luminophoric mediums for each LED in order to produce light having color points within the suitable blue color ranges 301A-C, red color ranges 302A-C, yellow/green color ranges 303A-C, and cyan color ranges 304A-C described herein. The light emitted by each LED string, i.e., the light emitted from the LED(s) and associated recipient luminophoric medium together, can have a spectral power distribution ("SPD") having spectral power with ratios of power across the visible wavelength spectrum from about 380 nm to about 780 nm. While not wishing to be bound by any particular theory, it is speculated that the use of such LEDs in combination with recipient luminophoric mediums to create unsaturated light within the suitable color ranges 301A-C, 302A-C, 303A-C, and 304A-C provides for improved color rendering performance for white light across a predetermined range of CCTs from a single device 100. Some suitable ranges for spectral power distribution ratios of the light emitted by the four LED strings (101A/101B/101C/101D) and recipient luminophoric mediums (102A/102B/102C/102D) together are shown in FIGS. 7 and 8. The figures show the ratios of spectral power within wavelength ranges, with an arbitrary reference wavelength range selected for each color range and normalized to a value of 100.0. FIGS. 7 and 8 show suitable minimum and maximum values for the spectral intensities within various ranges relative to the normalized range with a value of 100.0, for the color points within the blue, cyan, yellow/green ("yag"), and red color ranges. While not wishing to be bound by any particular theory, it is speculated that because the spectral power distributions for generated light with color points within the blue, cyan, and yellow/green color ranges contains higher spectral intensity across visible wavelengths as compared to lighting apparatuses and methods that utilize more saturated colors, this allows for improved color rendering.

Blends of luminescent materials can be used in luminophoric mediums (102A/102B/102C/102D) to create luminophoric mediums having the desired saturated color points when excited by their respective LED strings (101A/101B/101C/101D). Traditionally, any desired combined output light can be generated along a tie line between the LED string output light color point and the saturated color point of the associated recipient luminophoric medium by utilizing different ratios of total luminescent material to the encapsulant material in which it is incorporated. Increasing the amount of luminescent material in the optical path will shift the output light color point towards the saturated color point of the luminophoric medium. In some instances, the desired saturated color point of a recipient luminophoric medium can be achieved by blending two or more luminescent materials in a ratio. The appropriate ratios to achieve the desired saturated color point can be determined via methods known in the art. Generally speaking, any blend of luminescent materials can be treated as if it were a single luminescent material, thus the ratio of luminescent materials in the blend can be adjusted to continue to meet a target CIE value for LED strings having different peak emission wavelengths. Luminescent materials can be tuned for the desired excitation in response to the selected LEDs used in the LED strings (101A/101B/101C/101D), which may have different peak emission wavelengths within the range of from about 360 nm to about 535 nm. Suitable methods for tuning the excitation and emission of luminescent materials are known in the art and may include altering the concentrations of dopants within a phosphor, for example.

In some implementations of the present disclosure, luminophoric mediums can be provided with combinations of two types of luminescent materials. The first type of luminescent material emits light at a peak emission between about 515 nm and about 590 nm in response to the associated LED string emission. The second type of luminescent material emits at a peak emission between about 590 nm and about 700 nm in response to the associated LED string emission. In some instances, the luminophoric mediums disclosed herein can be formed from a combination of at least one luminescent material of the first and second types described in this paragraph. In implementations, the luminescent materials of the first type can emit light at a peak emission at about 515 nm, 525 nm, 530 nm, 535 nm, 540 nm, 545 nm, 550 nm, 555 nm, 560 nm, 565 nm, 570 nm, 575 nm, 580 nm, 585 nm, or 590 nm in response to the associated LED string emission. In preferred implementations, the luminescent materials of the first type can emit light at a peak emission between about 520 nm to about 555 nm. In implementations, the luminescent materials of the second type can emit light at a peak emission at about 590 nm, about 595 nm, 600 nm, 605 nm, 610 nm, 615 nm, 620 nm, 625 nm, 630 nm, 635 nm, 640 nm, 645 nm, 650 nm, 655 nm, 670 nm, 675 nm, 680 nm, 685 nm, 690 nm, 695 nm, or 670 nm in response to the associated LED string emission. In preferred implementations, the luminescent materials of the first type can emit light at a peak emission between about 600 nm to about 670 nm. Some exemplary luminescent materials of the first and second type are disclosed elsewhere herein and referred to as Compositions A-F.

In some implementations, the luminescent materials of the present disclosure may comprise one or more phosphors comprising one or more of the following materials: $BaMg_2Al_{16}O_{27}:Eu^{2+}$, $BaMg_2Al_{16}O_{27}:Eu^{2+},Mn^{2+}$, $CaSiO_3:Pb,Mn$, $CaWO_4:Pb$, $MgWO_4$, $Sr_5Cl(PO_4)_3:Eu^{2+}$, $Sr_2P_2O_7:Sn^{2+}$, $Sr_6P_5BO_2O:Eu$, $Ca_5F(PO_4)_3:Sb$, $(Ba,Ti)_2P_2O_7:Ti$, $Sr_5F(PO_4)_3:Sb,Mn$, $(La,Ce,Tb)PO_4:Ce,Tb$, $(Ca,Zn,Mg)_3(PO_4)_2:Sn$, $(Sr,Mg)_3(PO_4)_2:Sn$, $Y_2O_3:Eu^{3+}$, $Mg_4(F)GeO_6:Mn$, $LaMgAl_{11}O_{19}:Ce$, $LaPO_4:Ce$, $SrAl_{12}O_{19}:Ce$, $BaSi_2O_5:Pb$, $SrB_4O_7:Eu$, $Sr_2MgSi_2O_7:Pb$, $Gd_2O_2S:Tb$, $Gd_2O_2S:Eu$, $Gd_2O_2S:Pr$, $Gd_2O_2S:Pr,Ce,F$, $Y_2O_2S:Tb$, $Y_2O_2S:Eu$, $Y_2O_2S:Pr$, $Zn(0.5)Cd(0.4)S:Ag$, $Zn(0.4)Cd(0.6)S:Ag$, $Y_2SiO_5:Ce$, $YAlO_3:Ce$, $Y_3(Al,Ga)_5O_{12}:Ce$, $CdS:In$, $ZnO:Ga$, $ZnO:Zn$, $(Zn,Cd)S:Cu,Al$, $ZnCdS:Ag,Cu$, $ZnS:Ag$, $ZnS:Cu$, $NaI:Tl$, $CsI:Tl$, $^6LiF/ZnS:Ag$, $^6LiF/ZnS:Cu,Al,Au$, $ZnS:Cu,Al$, $ZnS:Cu,Au,Al$, $CaAl\,SiN_3:Eu$, $(Sr,Ca)Al\,SiN_3:Eu$, $(Ba,Ca,Sr,Mg)_2SiO_4:Eu$, $Lu_3Al_5O_{12}:Ce$, $Eu^{3+}(Gd_{0.9}Y_{0.1})_3Al_5O_{12}:Bi^{3+},Tb^{3+}$, $Y_3Al_5O_{12}:Ce$, $(La,Y)_3Si_6N_{11}:Ce$, $Ca_2AlSi_3O_2N_5:Ce^{3+}$, $Ca_2AlSi_3O_2N_5:Eu^{2+}$, $BaMgAl_{10}O_{17}:Eu$, $Sr_5(PO_4)_3Cl:Eu$, $(Ba,Ca,Sr,Mg)_2SiO_4:Eu$, $Si_{6-z}Al_z N_{8-z}O_z:Eu$ (wherein $0<z\leq4.2$); $M_3Si_6O_{12}N_2:Eu$ (wherein M=alkaline earth metal element), $(Mg,Ca,Sr,Ba)Si_2O_2N_2:Eu$, $Sr_4Al_{14}O_{25}:Eu$, $(Ba,Sr,Ca)Al_2O_4:Eu$, $(Sr,Ba)Al_2Si_2O_8:Eu$, $(Ba,Mg)_2SiO_4:Eu$, $(Ba,Sr,Ca)_2(Mg, Zn)Si_2O_7:Eu$, $(Ba,Ca,Sr,Mg)_9(Sc,Y,Lu,Gd)_2(Si,Ge)_6O_{24}:Eu$, $Y_2SiO_5:CeTb$, $Sr_2P_2O_7-Sr_2B_2O_5:Eu$, $Sr_2Si_3O_8-2SrCl_2:Eu$, $Zn_2SiO_4:Mn$, $CeMgAl_{11}O_{19}:Tb$, $Y_3Al_5O_{12}:Tb$, $Ca_2Y_8(SiO_4)_6O_2:Tb$, $La_3Ga_5SiO_{14}:Tb$, $(Sr,Ba,Ca)Ga_2S_4:Eu,Tb,Sm$, $Y_3(Al,Ga)_5O_{12}:Ce$, $(Y,Ga,Tb,La,Sm,Pr,Lu)_3(Al,Ga)_5O_{12}:Ce$, $Ca_3Sc_2Si_3O_{12}:Ce$, $Ca_3(Sc,Mg,Na,Li)_2Si_3O_{12}:Ce$, $CaSc_2O_4:Ce$, Eu-activated β-Sialon, $SrAl_2O_4:Eu$, $(La,Gd,Y)_2O_2S:Tb$, $CeLaPO_4:Tb$, $ZnS:Cu,Al$, $ZnS:Cu,Au,Al$, $(Y,Ga,Lu,Sc,La)BO_3:Ce,Tb$, $Na_2Gd_2B_2O_7:Ce,Tb$, $(Ba,Sr)_2(Ca,Mg,Zn)B_2O_6:K,Ce,Tb$, $Ca_8Mg(SiO_4)_4Cl_2:Eu,Mn$, $(Sr,Ca,Ba)(Al,Ga,In)_2S_4:Eu$, $(Ca,Sr)_8(Mg,Zn)(SiO_4)_4Cl_2:Eu,Mn$, $M_3Si_6O_9N_4:Eu$, $Sr_5Al_5Si_{21}O_2N_{35}:Eu$, $Sr_3Si_{13}Al_3N_{21}O_2:Eu$, $(Mg,Ca,Sr,Ba)_2Si_5N_8:Eu$, $(La,Y)_2O_2S:Eu$, $(Y,La,Gd,Lu)_2O_2S:Eu$, $Y(V,P)O_4:Eu$, $(Ba,Mg)_2SiO_4:Eu,Mn$, $(Ba,Sr,Ca,Mg)_2SiO_4:Eu,Mn$, $LiW_2O_8:Eu$, $LiW_2O_8:Eu,Sm$, $Eu_2W_2O_9$, $Eu_2W_2O_9:Nb$ and $Eu_2W_2O_9:Sm$, $(Ca,Sr)S:Eu$, $YAlO_3:Eu$, $Ca_2Y_8(SiO_4)_6O_2:Eu$, $LiY_9(SiO_4)_6O_2:Eu$, $(Y,Gd)_3Al_5O_{12}:Ce$, $(Tb,Gd)_3Al_5O_{12}:Ce$, $(Mg,Ca,Sr,Ba)_3Si_5(N,O)_8:Eu$, $(Mg,Ca,Sr,Ba)Si(N,O)_2:Eu$, $(Mg,Ca,Sr,Ba)AlSi(N,O)_3:Eu$, $(Sr,Ca,Ba,Mg)_{10}(PO_4)_6Cl_2:Eu$, Mn, Eu,Ba$_3$MgSi$_2$O$_8$:Eu,Mn, (Ba,Sr,Ca,Mg)$_3$(Zn,Mg)Si$_2$O$_8$:Eu, Mn, (k-x)MgO.xAF$_2$.GeO$_2$:yMn$^{4+}$ (wherein k=2.8 to 5, x=0.1 to 0.7, y=0.005 to 0.015, A=Ca, Sr, Ba, Zn or a mixture thereof), Eu-activated α-Sialon, (Gd,Y,Lu,La)$_2$O$_3$: Eu, Bi, (Gd,Y,Lu,La)$_2$O$_2$S:Eu,Bi, (Gd,Y, Lu,La)VO$_4$:Eu,Bi, SrY$_2$S$_4$:Eu,Ce, CaLa$_2$S$_4$:Ce,Eu, (Ba,Sr,Ca)MgP$_2$O$_7$:Eu, Mn, (Sr,Ca,Ba,Mg,Zn)$_2$P$_2$O$_7$:Eu,Mn, (Y,Lu)$_2$WO$_6$:Eu,Ma, (Ba, Sr,Ca)$_x$Si$_y$N$_z$:Eu,Ce (wherein x, y and z are integers equal to or greater than 1), (Ca,Sr,Ba,Mg)$_{10}$(PO$_4$)$_6$(F,Cl,Br,OH):Eu, Mn, ((Y,Lu,Gd,Tb)$_{1-x-y}$Sc$_x$Ce$_y$)$_2$(Ca,Mg)(Mg,Zn)$_{2+r}$Si$_{z-q}$Ge$_q$O$_{12+\delta}$, SrAlSi$_4$N$_7$, Sr$_2$Al$_2$Si$_9$O$_2$N$_{14}$:Eu, M$^1{}_a$M$^2{}_b$M$^3{}_c$O$_d$ (wherein M$^1$=activator element including at least Ce, M$^2$=bivalent metal element, M$^3$=trivalent metal element, $0.0001 \leq a \leq 0.2$, $0.8 \leq b \leq 1.2$, $1.6 \leq c \leq 2.4$ and $3.2 \leq d \leq 4.8$), A$_{2+x}$M$_y$Mn$_z$F$_n$ (wherein A=Na and/or K; M=Si and Al, and $-1 \leq x \leq 1$, $0.9 \leq y+z \leq 1.1$, $0.001 \leq z \leq 0.4$ and $5 \leq n \leq 7$), KSF/KSNAF, or (La$_{1-x-y}$, Eu$_x$, Ln$_y$)$_2$O$_2$S (wherein $0.02 \leq x \leq 0.50$ and $0 \leq y \leq 0.50$, Ln=Y$^{3+}$, Gd$^{3+}$, Lu$^{3+}$, Sc$^{3+}$, Sm$^{3+}$ or Er$^{3+}$). In some preferred implementations, the luminescent materials may comprise phosphors comprising one or more of the following materials: CaAlSiN$_3$:Eu, (Sr,Ca)AlSiN$_3$:Eu, BaMgAl$_{10}$O$_{17}$:Eu, (Ba,Ca,Sr,Mg)$_2$SiO$_4$: Eu, β-SiAlON, Lu$_3$Al$_5$O$_{12}$:Ce, Eu$^{3+}$(Cd$_{0.9}$Y$_{0.1}$)$_3$A$_{15}$O$_{12}$: Bi$^{3+}$,Tb$^{3+}$, Y$_3$Al$_5$O$_{12}$:Ce, La$_3$Si$_6$N$_{11}$:Ce, (La,Y)$_3$Si$_6$N$_{11}$:Ce, Ca$_2$AlSi$_3$O$_2$N$_5$:Ce$^{3+}$, Ca$_2$AlSi$_3$O$_2$N$_5$:Ce$^{3+}$,Eu$^{2+}$, Ca$_2$AlSi$_3$O$_2$N$_5$:Eu$^{2+}$, BaMgAl$_{10}$O$_{17}$:Eu$^{2+}$, Sr$_{4.5}$Eu$_{0.5}$ (PO$_4$)$_3$Cl, or M$^1{}_a$M$^2{}_b$M$^3{}_c$O$_d$ (wherein M$^1$=activator element comprising Ce, M$^2$=bivalent metal element, M$^3$=trivalent metal element, $0.0001 \leq a \leq 0.2$, $0.8 \leq b \leq 1.2$, $1.6 \leq c \leq 2.4$ and $3.2 \leq d \leq 4.8$). In further preferred implementations, the luminescent materials may comprise phosphors comprising one or more of the following materials: CaAlSiN$_3$:Eu, BaMgAl$_{10}$O$_{17}$:Eu, Lu$_3$Al$_5$O$_{12}$:Ce, or Y$_3$Al$_5$O$_{12}$:Ce.

Luminescent materials can include an inorganic or organic phosphor; silicate-based phosphors; aluminate-based phosphors; aluminate-silicate phosphors; nitride phosphors; sulfate phosphor; oxy-nitrides and oxy-sulfate phosphors; or garnet materials. The phosphor materials are not limited to any specific examples and can include any phosphor material known in the art with the desired emission spectra in response to the selected excitation light source, i.e. the associated LED or LEDs that produce light that impacts the recipient luminophoric medium. The d50 (average diameter) value of the particle size of the phosphor luminescent materials can be between about 1 μm and about preferably between about 10 μm and about 20 and more preferably between about 13.5 μm and about 18 Quantum dots are also known in the art. The color of light produced is from the quantum confinement effect associated with the nano-crystal structure of the quantum dots. The energy level of each quantum dot relates directly to the size of the quantum dot. Suitable semiconductor materials for quantum dots are known in the art and may include materials formed from elements from groups II-V, II-VI, or IV-VI in particles having core, core/shell, or core/shells structures and with or without surface-modifying ligands.

Tables 1 and 2 shows aspects of some exemplary luminescent compositions and properties, referred to as Compositions "A"-"F".

TABLE 1

| | | | Exemplary Embodiment | | Suitable Ranges | |
|---|---|---|---|---|---|---|
| | Exemplary Material(s) | density (g/mL) | Emission Peak (nm) | FWHM (nm) | Emission Peak Range (nm) | FWHM Range (nm) |
| Composition "A" | Luag: Cerium doped lutetium aluminum garnet (Lu$_3$Al$_5$O$_{12}$) | 6.73 | 535 | 95 | 530-540 | 90-100 |
| Composition "B" | Yag: Cerium doped yttrium aluminum garnet (Y$_3$Al$_5$O$_{12}$) | 4.7 | 550 | 110 | 545-555 | 105-115 |
| Composition "C" | a 650 nm-peak wavelength emission phosphor: Europium doped calcium aluminum silica nitride (CaAlSiN$_3$) | 3.1 | 650 | 90 | 645-655 | 85-95 |
| Composition "D" | a 525 nm-peak wavelength emission phosphor: GBAM: BaMgAl$_{10}$O$_{17}$:Eu | 3.1 | 525 | 60 | 520-530 | 55-65 |
| Composition "E" | a 630 nm-peak wavelength emission quantum dot: any semiconductor quantum dot material of appropriate size for desired emission wavelengths | 5.1 | 630 | 40 | 625-635 | 35-45 |
| Composition "F" | a 610 nm-peak wavelength emission quantum dot: any semiconductor quantum dot | 5.1 | 610 | 40 | 605-615 | 35-45 |

TABLE 1-continued

| | | | Exemplary Embodiment | | Suitable Ranges | |
|---|---|---|---|---|---|---|
| | Exemplary Material(s) | density (g/mL) | Emission Peak (nm) | FWHM (nm) | Emission Peak Range (nm) | FWHM Range (nm) |
| Matrix "M" | material of appropriate size for desired emission wavelengths Silicone binder | 1.1 mg/mm³ | | | | |

TABLE 2

| | | Implementation 1 | | Implementation 2 | |
|---|---|---|---|---|---|
| Designator | Exemplary Material(s) | particle size (d50) | refractive index | particle size | refractive index |
| Composition "A" | Luag: Cerium doped lutetium aluminum garnet ($Lu_3Al_5O_{12}$) | 18.0 μm | 1.84 | 40 μm | 1.8 |
| Composition "B" | Yag: Cerium doped yttrium aluminum garnet ($Y_3Al_5O_{12}$) | 13.5 μm | 1.82 | 30 μm | 1.85 |
| Composition "C" | a 650 nm-peak wavelength emission phosphor: Europium doped calcium aluminum silica nitride ($CaAlSiN_3$) | 15.0 μm | 1.8 | 10 μm | 1.8 |
| Composition "D" | a 525 nm-peak wavelength emission phosphor: GBAM: $BaMgAl_{10}O_{17}$: Eu | 15.0 μm | 1.8 | n/a | n/a |
| Composition "E" | a 630 nm-peak wavelength emission quantum dot: any semiconductor quantum dot material of appropriate size for desired emission wavelengths | 10.0 nm | 1.8 | n/a | n/a |
| Composition "F" | a 610 nm-peak wavelength emission quantum dot: any semiconductor quantum dot material of appropriate size for desired emission wavelengths | 10.0 nm | 1.8 | n/a | n/a |
| Matrix "M" | Silicone binder | | 1.545 | | 1.545 |

Blends of Compositions A-F can be used in luminophoric mediums (102A/102B/102C/102D) to create luminophoric mediums having the desired saturated color points when excited by their respective LED strings (101A/101B/101C/101D). In some implementations, one or more blends of one or more of Compositions A-F can be used to produce luminophoric mediums (102A/102B/102C/102D). In some preferred implementations, one or more of Compositions A, B, and D and one or more of Compositions C, E, and F can be combined to produce luminophoric mediums (102A/102B/102C/102D). In some preferred implementations, the encapsulant for luminophoric mediums (102A/102B/102C/102D) comprises a matrix material having density of about 1.1 mg/mm³ and refractive index of about 1.545. Other matrix materials having refractive indices of between about 1.4 and about 1.6 can also be used in some implementations. In some implementations, Composition A can have a refractive index of about 1.82 and a particle size from about 18 micrometers to about 40 micrometers. In some implementations, Composition B can have a refractive index of about 1.84 and a particle size from about 13 micrometers to about 30 micrometers. In some implementations, Composition C can have a refractive index of about 1.8 and a particle size from about 10 micrometers to about 15 micrometers. In some implementations, Composition D can have a refractive index of about 1.8 and a particle size from about 10 micrometers to about 15 micrometers. Suitable phosphor materials for Compositions A, B, C, and D are commercially available from phosphor manufacturers such as Mitsubishi Chemical Holdings Corporation (Tokyo, Japan), Intematix Corporation (Fremont, Calif.), EMD Performance Materials of Merck KGaA (Darmstadt, Germany), and PhosphorTech Corporation (Kennesaw, Ga.).

In some implementations, Composition A can be selected from the "BG-801" product series sold by Mitsubishi Chemical Corporation. The BG-801 series is provided as cerium doped lutetium aluminum garnet ($Lu_3Al_5O_{12}$). For some implementations, other phosphor materials are also suitable and can have peak emission wavelengths of between about 530 nm and about 560 nm, FWHM of between about 90 nm and about 110 nm, and particle sizes (d50) of between about 10 µm and about 50 µm.

In some implementations, Composition B can be selected from the "BY-102" or "BY-202" product series sold by Mitsubishi Chemical Corporation. The BY-102 series is provided as cerium doped yttrium aluminum garnet ($Y_3Al_5O_{12}$). The BY-202 series is provided as $(La,Y)_3Si_6N_{11}$:Ce. For some implementations, other phosphor materials are also suitable and can have peak emission wavelengths of between about 545 nm and about 560 nm, FWHM of between about 90 nm and about 115 nm, and particle sizes (d50) of between about 10 µm and about 50 µm.

In some implementations, Composition C can be selected from the "BR-101", "BR-102", or "BR-103" product series sold by Mitsubishi Chemical Corporation. The BR-101 series is provided as europium doped calcium aluminum silica nitride ($CaAlSiN_3$). The BR-102 series is provided as europium doped strontium substituted calcium aluminum silica nitride $(Sr,Ca)AlSiN_3$. The BR-103 series is provided as europium doped strontium substituted calcium aluminum silica nitride $(Sr,Ca)AlSiN_3$. For some implementations, other phosphor materials are also suitable and can have peak emission wavelengths of between about 610 nm and about 650 nm, FWHM of between about 80 nm and about 105 nm, and particle sizes (d50) of between about 5 µm and about 50 µm.

In some implementations, Composition D can be selected from the "VG-401" product series sold by Mitsubishi Chemical Corporation. The VG-401 series is provided as $GBAM:BaMgAl_{10}O_{17}$:Eu. For some implementations, other phosphor materials are also suitable and can have peak emission wavelengths of between about 510 nm and about 540 nm, FWHM of between about 45 nm and about 75 nm, and particle sizes (d50) of between about 5 µm and about 50 µm.

EXAMPLES

General Simulation Method.

Devices having four LED strings with particular color points were simulated. For each device, four LED strings and recipient luminophoric mediums with particular emissions were selected, and spectral power distributions for the resulting four channels (blue, red, yellow/green, and cyan) were calculated.

The calculations were performed with Scilab (Scilab Enterprises, Versailles, France), LightTools (Synopsis, Inc., Mountain View, Calif.), and custom software created using Python (Python Software Foundation, Beaverton, Oreg.). Each LED string was simulated with an LED emission spectrum and excitation and emission spectra of luminophoric medium(s). For luminophoric mediums comprising phosphors, the simulations also included the absorption spectrum and particle size of phosphor particles. The LED strings generating combined emissions within blue, red and yellow/green color regions were prepared using spectra of a LUXEON Z Color Line royal blue LED (product code LXZ1-PR01) of color bin codes 3, 4, 5, or 6 or a LUXEON Z Color Line blue LED (LXZ1-PB01) of color bin code 1 or 2 (Lumileds Holding B.V., Amsterdam, Netherlands). The LED strings generating combined emissions with color points within the cyan regions were prepared using spectra of a LUXEON Z Color Line blue LED (LXZ1-PB01) of color bin code 5 or LUXEON Z Color Line cyan LED (LXZ1-PE01) color bin code 1, 8, or 9 (Lumileds Holding B.V., Amsterdam, Netherlands). Similar LEDs from other manufacturers such as OSRAM GmbH and Cree, Inc. could also be used.

The luminophoric mediums used in the following examples were calculated as combinations of one or more of Compositions A, B, and D and one or more of Compositions C, E, and F as described more fully elsewhere herein. Those of skill in the art appreciate that various combinations of LEDs and luminophoric blends can be combined to generate combined emissions with desired color points on the 1931 CIE chromaticity diagram and the desired spectral power distributions.

Example 1

A semiconductor light emitting device was simulated having four LED strings. A first LED string is driven by a blue LED having peak emission wavelength of approximately 450 nm to approximately 455 nm, utilizes a recipient luminophoric medium, and generates a combined emission of a blue color point with a 1931 CIE chromaticity diagram color point of (0.2625, 0.1763). A second LED string is driven by a blue LED having peak emission wavelength of approximately 450 nm to approximately 455 nm, utilizes a recipient luminophoric medium, and generates a combined emission of a red color point with a 1931 CIE chromaticity diagram color point of (0.5842, 0.3112). A third LED string is driven by a blue LED having peak emission wavelength of approximately 450 nm to approximately 455 nm, utilizes a recipient luminophoric medium, and generates a combined emission of a yellow/green color point with a 1931 CIE chromaticity diagram color point of (0.4482, 0.5258). A fourth LED string is driven by a cyan LED having a peak emission wavelength of approximately 505 nm, utilizes a recipient luminophoric medium, and generates a combined emission of a cyan color point with a 1931 CIE chromaticity diagram color point of (0.3258, 0.5407). Table 3 below shows the spectral power distributions for the blue, red, yellow-green, and cyan color points generated by the device of this Example, with spectral power shown within wavelength ranges in nanometers from 380 nm to 780 nm, with an arbitrary reference wavelength range selected for each color range and normalized to a value of 100.0:

TABLE 3

|  | 380-420 | 421-460 | 461-500 | 501-540 | 541-580 | 581-620 | 621-660 | 661-700 | 701-740 | 741-780 |
| --- | --- | --- | --- | --- | --- | --- | --- | --- | --- | --- |
| Blue | 0.4 | 100.0 | 20.9 | 15.2 | 25.3 | 26.3 | 25.1 | 13.9 | 5.2 | 1.6 |
| Red | 0.0 | 9.6 | 2.0 | 1.4 | 9.0 | 48.5 | 100.0 | 73.1 | 29.5 | 9.0 |
| Yellow-Green | 1.0 | 1.1 | 5.7 | 75.8 | 100.0 | 83.6 | 69.6 | 40.9 | 15.6 | 4.7 |
| Cyan | 0.1 | 0.5 | 53.0 | 100.0 | 65.0 | 41.6 | 23.1 | 11.6 | 4.2 | 0.6 |

Tables 4 and 5 show exemplary luminophoric mediums suitable for the recipient luminophoric mediums for the blue, red, yellow/green, and cyan channels of this Example, using the Compositions A-F from Implementation 1 or Implementation 2 as described in Tables 1 and 2 above.

diagram color point of (0.5842, 0.3112). A third LED string is driven by a blue LED having peak emission wavelength of approximately 450 nm to approximately 455 nm, utilizes a recipient luminophoric medium, and generates a combined emission of a yellow/green color point with a 1931 CIE

TABLE 4

Volumetric Ratios - Using "Implementation 1"
Compositions from Tables 1 and 2

| | Comp. A | Comp. B | Comp. C | Comp. D | Comp. E | Comp. F | Matrix |
|---|---|---|---|---|---|---|---|
| Blue Blend 1 | | 1.54 | 0.87 | | | | 97.60 |
| Blue Blend 2 | 1.68 | | 1.89 | | | | 96.43 |
| Blue Blend 3 | 1.35 | 0.58 | 1.49 | | | | 96.58 |
| Blue Blend 4 | | | 1.84 | 1.34 | | | 96.82 |
| Blue Blend 5 | | 0.86 | 1.51 | 0.93 | | | 96.69 |
| Blue Blend 6 | 0.89 | | | | 1.73 | 0.35 | 97.03 |
| Blue Blend 7 | | 1.34 | | | 1.11 | | 97.55 |
| Red Blend 1 | | 1.66 | 24.23 | | | | 74.11 |
| Red Blend 2 | 1.96 | | 24.72 | | | | 73.32 |
| Red Blend 3 | 0.00 | 3.43 | 26.48 | | | | 70.10 |
| Red Blend 4 | | | 21.36 | 1.70 | | | 76.94 |
| Red Blend 5 | | 0.80 | 24.49 | 1.22 | | | 73.49 |
| Red Blend 6 | 0.22 | | | | 12.74 | 11.75 | 75.28 |
| Red Blend 7 | | 0.07 | | | 15.34 | 7.90 | 76.70 |
| Yellow/Green Blend 1 | 54.92 | | 1.82 | | | | 43.26 |
| Yellow/Green Blend 2 | 56.18 | 3.90 | 0.07 | | | | 39.86 |
| Yellow/Green Blend 3 | | | 2.49 | 20.51 | | | 77.00 |
| Yellow/Green Blend 4 | | 5.21 | 5.34 | 46.86 | | | 42.59 |
| Yellow/Green Blend 5 | 38.63 | | | | 1.55 | 1.84 | 57.98 |
| Cyan Blend 1 | | 4.45 | 9.16 | | | | 86.38 |
| Cyan Blend 2 | 6.29 | | 11.67 | | | | 82.03 |
| Cyan Blend 3 | 2.03 | 3.16 | 9.94 | | | | 84.86 |
| Cyan Blend 4 | | | 6.30 | 4.42 | | | 89.28 |
| Cyan Blend 5 | | 3.30 | 6.93 | 1.41 | | | 88.36 |
| Cyan Blend 6 | 9.12 | | | | 11.67 | 9.29 | 69.92 |
| Cyan Blend 7 | | 4.82 | | | 9.43 | 6.60 | 79.15 |

TABLE 5

Volumetric Ratios - Using "Implementation 2"
Compositions from Tables 1 and 2

| | Comp. A | Comp. B | Comp. C | Comp. D | Comp. E | Comp. F | Matrix |
|---|---|---|---|---|---|---|---|
| Blue Blend 8 | | 1.13 | 1.12 | | | | 97.75 |
| Blue Blend 9 | 0.73 | | 2.38 | | | | 96.89 |
| Blue Blend 10 | 0.1 | 0.14 | 1.6 | | | | 97.16 |
| Red Blend 8 | | 0.58 | 16.23 | | | | 83.19 |
| Red Blend 9 | 0.42 | | 16.63 | | | | 82.95 |
| Red Blend 10 | 1.79 | 3.09 | 17.6 | | | | 77.52 |
| Yellow/Green Blend 6 | 94.48 | 0.04 | 3.51 | | | | 1.97 |
| Cyan Blend 8 | | 3.07 | 3.67 | | | | 93.26 |
| Cyan Blend 9 | 5.32 | | 4.2 | | | | 90.48 |

Example 2

A semiconductor light emitting device was simulated having four LED strings. A first LED string is driven by a blue LED having peak emission wavelength of approximately 450 nm to approximately 455 nm, utilizes a recipient luminophoric medium, and generates a combined emission of a blue color point with a 1931 CIE chromaticity diagram color point of (0.2625, 0.1763). A second LED string is driven by a blue LED having peak emission wavelength of approximately 450 nm to approximately 455 nm, utilizes a recipient luminophoric medium, and generates a combined emission of a red color point with a 1931 CIE chromaticity diagram color point of (0.5108, 0.4708). A fourth LED string is driven by a cyan LED having a peak emission wavelength of approximately 505 nm, utilizes a recipient luminophoric medium, and generates a combined emission of a cyan color point with a 1931 CIE chromaticity diagram color point of (0.3258, 0.5407). Table 6 below shows the spectral power distributions for the blue, red, yellow-green, and cyan color points generated by the device of this Example, with spectral power shown within wavelength ranges in nanometers from 380 nm to 780 nm, with an arbitrary reference wavelength range selected for each color range and normalized to a value of 100.0:

TABLE 6

|  | 380-420 | 421-460 | 461-500 | 501-540 | 541-580 | 581-620 | 621-660 | 661-700 | 701-740 | 741-780 |
|---|---|---|---|---|---|---|---|---|---|---|
| Blue | 0.3 | 100.0 | 196.1 | 33.0 | 40.3 | 38.2 | 34.2 | 20.4 | 7.8 | 2.3 |
| Red | 0.0 | 157.8 | 2.0 | 1.4 | 9.0 | 48.5 | 100.0 | 73.1 | 29.5 | 9.0 |
| Yellow-Green | 0.0 | 1.0 | 4.2 | 56.6 | 100.0 | 123.4 | 144.9 | 88.8 | 34.4 | 10.5 |
| Cyan | 0.1 | 0.5 | 53.0 | 100.0 | 65.0 | 41.6 | 23.1 | 11.6 | 4.2 | 0.6 |

Tables 7 and 8 show exemplary luminophoric mediums suitable for the recipient luminophoric mediums for the blue, red, yellow/green, and cyan channels of this Example, using the Compositions A-F from Implementation 1 or Implementation 2 as described in Tables 1 and 2 above.

TABLE 7

Volumetric Ratios - Using "Implementation 1"
Compositions from Tables 1 and 2

|  | Comp. A | Comp. B | Comp. C | Comp. D | Comp. E | Comp. F | Matrix |
|---|---|---|---|---|---|---|---|
| Blue Blend 1 |  | 1.54 | 0.87 |  |  |  | 97.59 |
| Blue Blend 2 |  | 1.34 |  |  | 1.11 |  | 97.55 |
| Blue Blend 3 | 1.68 |  | 1.89 |  |  |  | 96.43 |
| Blue Blend 4 | 1.35 | 0.58 | 1.49 |  |  |  | 96.58 |
| Blue Blend 5 |  |  | 1.84 | 1.34 |  |  | 96.82 |
| Blue Blend 6 |  | 0.86 | 1.51 | 0.93 |  |  | 96.69 |
| Blue Blend 7 | 0.89 |  |  |  | 1.73 | 0.35 | 97.03 |
| Red Blend 1 |  | 1.66 | 24.23 |  |  |  | 74.11 |
| Red Blend 2 |  | 0.07 |  |  | 15.34 | 7.90 | 76.70 |
| Red Blend 3 | 1.96 |  | 24.72 |  |  |  | 73.32 |
| Red Blend 4 |  | 3.43 | 26.48 |  |  |  | 70.10 |
| Red Blend 5 |  |  | 21.36 | 1.70 |  |  | 76.94 |
| Red Blend 6 |  | 0.80 | 24.49 | 1.22 |  |  | 73.49 |
| Red Blend 7 | 0.22 |  |  |  | 12.74 | 11.75 | 75.28 |
| Yellow/Green Blend 1 |  | 50.54 | 0.02 |  |  |  | 49.44 |
| Yellow/Green Blend 2 |  | 37.70 |  |  | 1.40 | 0.61 | 60.28 |
| Yellow/Green Blend 3 | 43.22 |  | 15.08 |  |  |  | 41.70 |
| Yellow/Green Blend 4 |  |  | 6.51 | 19.90 |  |  | 73.59 |
| Yellow/Green Blend 5 |  | 5.01 | 15.89 | 37.71 |  |  | 41.39 |
| Yellow/Green Blend 6 | 24.41 |  |  |  | 9.45 | 11.02 | 55.11 |
| Cyan Blend 1 |  | 4.45 | 9.16 |  |  |  | 86.38 |
| Cyan Blend 2 |  | 4.82 |  |  | 9.43 | 6.60 | 79.15 |
| Cyan Blend 3 | 6.29 |  | 11.67 |  |  |  | 82.03 |
| Cyan Blend 4 | 2.03 | 3.16 | 9.94 |  |  |  | 84.86 |
| Cyan Blend 5 |  |  | 6.30 | 4.42 |  |  | 89.28 |
| Cyan Blend 6 |  | 3.30 | 6.93 | 1.41 |  |  | 88.36 |
| Cyan Blend 7 | 9.12 |  |  |  | 11.67 | 9.29 | 69.92 |

TABLE 8

Volumetric Ratios - Using "Implementation 2"
Compositions from Tables 1 and 2

|  | Comp. A | Comp. B | Comp. C | Comp. D | Comp. E | Comp. F | Matrix |
|---|---|---|---|---|---|---|---|
| Blue Blend 8 | 0 | 1.13 | 1.12 |  |  |  | 97.75 |
| Blue Blend 9 | 0.73 | 0 | 2.38 |  |  |  | 96.89 |
| Blue Blend 10 | 0.1 | 0.14 | 1.6 |  |  |  | 98.16 |
| Red Blend 8 | 0 | 0.58 | 16.23 |  |  |  | 83.19 |
| Red Blend 9 | 0.42 | 0 | 16.63 |  |  |  | 82.95 |
| Red Blend 10 | 1.79 | 3.09 | 17.6 |  |  |  | 77.52 |
| Cyan Blend 8 | 0 | 3.07 | 3.67 |  |  |  | 93.26 |
| Cyan Blend 9 | 5.32 | 0 | 4.2 |  |  |  | 90.48 |

Example 3

A semiconductor light emitting device was simulated having four LED strings. A first LED string is driven by a blue LED having peak emission wavelength of approximately 450 nm to approximately 455 nm, utilizes a recipient luminophoric medium, and generates a combined emission of a blue color point with a 1931 CIE chromaticity diagram color point of (0.2219, 0.1755). A second LED string is driven by a blue LED having peak emission wavelength of approximately 450 nm to approximately 455 nm, utilizes a recipient luminophoric medium, and generates a combined emission of a red color point with a 1931 CIE chromaticity diagram color point of (0.5702, 0.3869). A third LED string is driven by a blue LED having peak emission wavelength of approximately 450 nm to approximately 455 nm, utilizes a recipient luminophoric medium, and generates a combined emission of a yellow/green color point with a 1931 CIE chromaticity diagram color point of (0.3722, 0.4232). A fourth LED string is driven by a cyan LED having a peak emission wavelength of approximately 505 nm, utilizes a recipient luminophoric medium, and generates a combined emission of a cyan color point with a 1931 CIE chromaticity diagram color point of (0.3704, 0.5083). Table 9 below shows the spectral power distributions for the blue, red, yellow-green, and cyan color points generated by the device of this Example, with spectral power shown within wavelength ranges in nanometers from 380 nm to 780 nm, with an arbitrary reference wavelength range selected for each color range and normalized to a value of 100.0:

TABLE 9

|   | 380-420 | 421-460 | 461-500 | 501-540 | 541-580 | 581-620 | 621-660 | 661-700 | 701-740 | 741-780 |
|---|---|---|---|---|---|---|---|---|---|---|
| Blue | 8.1 | 100.0 | 188.1 | 35.6 | 40.0 | 70.0 | 80.2 | 12.4 | 2.3 | 1.0 |
| Red | 0.7 | 2.1 | 4.1 | 12.2 | 20.5 | 51.8 | 100.0 | 74.3 | 29.3 | 8.4 |
| Yellow-Green | 1.0 | 25.3 | 52.7 | 77.5 | 100.0 | 80.5 | 62.0 | 35.1 | 13.3 | 4.0 |
| Cyan | 0.4 | 1.5 | 55.5 | 100.0 | 65.3 | 59.9 | 57.1 | 35.0 | 13.5 | 4.1 |

Tables 10 and 11 show exemplary luminophoric mediums suitable for the recipient luminophoric mediums for the blue, red, yellow/green, and cyan channels of this Example, using the Compositions A-F from Implementation 1 or Implementation 2 as described in Tables 1 and 2 above.

TABLE 10

| | Volumetric Ratios - Using "Implementation 1" Compositions from Tables 1 and 2 | | | | | | |
|---|---|---|---|---|---|---|---|
| | Comp. A | Comp. B | Comp. C | Comp. D | Comp. E | Comp. F | Matrix |
| Blue Blend 1 | | 1.47 | | | | | 98.53 |
| Blue Blend 2 | | 1.39 | | | 0.01 | | 98.60 |
| Blue Blend 3 | 1.84 | | 0.55 | | | | 97.60 |
| Blue Blend 4 | 1.54 | 0.55 | 0.07 | | | | 97.84 |
| Blue Blend 5 | | | 0.79 | 1.49 | | | 97.72 |
| Blue Blend 6 | | 0.74 | 0.31 | 1.33 | | | 97.63 |
| Blue Blend 7 | 1.21 | | | | 0.66 | | 98.13 |
| Red Blend 1 | | 11.66 | 21.77 | | | | 66.57 |
| Red Blend 2 | | 5.59 | | | 17.46 | 7.21 | 69.74 |
| Red Blend 3 | 13.17 | | 25.45 | | | | 61.38 |
| Red Blend 4 | 6.47 | 7.75 | 24.90 | | | | 60.88 |
| Red Blend 5 | | | 16.55 | 8.34 | | | 75.11 |
| Red Blend 6 | | 2.37 | 24.60 | 11.89 | | | 61.13 |
| Red Blend 7 | 4.57 | | | | 16.51 | 12.47 | 66.44 |
| Yellow/Green Blend 1 | 16.75 | | 2.44 | | | | 80.81 |
| Yellow/Green Blend 2 | 32.98 | 8.23 | 0.06 | | | | 58.73 |
| Yellow/Green Blend 3 | | | 2.90 | 7.46 | | | 89.64 |
| Yellow/Green Blend 4 | | 0.79 | 4.25 | 17.43 | | | 77.53 |
| Yellow/Green Blend 5 | 10.62 | | | | 1.98 | 2.24 | 85.17 |
| Cyan Blend 1 | | | 16.88 | | | | 83.12 |
| Cyan Blend 2 | | 2.29 | | | 16.58 | 8.02 | 73.11 |
| Cyan Blend 3 | 5.00 | | 16.18 | | | | 78.82 |
| Cyan Blend 4 | 0.43 | 2.74 | 15.68 | | | | 81.14 |
| Cyan Blend 5 | | | 12.05 | 1.75 | | | 86.20 |
| Cyan Blend 6 | | 0.03 | 10.52 | 2.79 | | | 86.66 |
| Cyan Blend 7 | 4.98 | | | | 14.42 | 12.74 | 67.86 |

TABLE 11

| | Volumetric Ratios - Using "Implementation 2" Compositions from Tables 1 and 2 | | | | | | |
|---|---|---|---|---|---|---|---|
| | Comp. A | Comp. B | Comp. C | Comp. D | Comp. E | Comp. F | Matrix |
| Blue Blend 8 | | 1.06 | | | | | 98.94 |
| Blue Blend 9 | 0.88 | | 0.64 | | | | 98.48 |
| Blue Blend 10 | 2.92 | 1.62 | | | | | 95.46 |
| Red Blend 8 | | 4.02 | 13.36 | | | | 82.62 |
| Red Blend 9 | 3.25 | | 15.67 | | | | 81.08 |
| Red Blend 10 | 16.56 | 15.37 | 16.88 | | | | 51.19 |
| Yellow Blend 6 | 39.09 | 3.06 | 1.16 | | | | 56.69 |
| Cyan Blend 8 | | 2.0 | 6.71 | | | | 91.29 |
| Cyan Blend 9 | 3.83 | | 6.51 | | | | 89.66 |

Example 4

A semiconductor light emitting device was simulated having four LED strings. A first LED string is driven by a blue LED having peak emission wavelength of approximately 450 nm to approximately 455 nm, utilizes a recipient luminophoric medium, and generates a combined emission of a blue color point with a 1931 CIE chromaticity diagram color point of (0.2387, 0.1692). A second LED string is driven by a blue LED having peak emission wavelength of approximately 450 nm to approximately 455 nm, utilizes a recipient luminophoric medium, and generates a combined emission of a red color point with a 1931 CIE chromaticity diagram color point of (0.5563, 0.3072). A third LED string is driven by a blue LED having peak emission wavelength of approximately 450 nm to approximately 455 nm, utilizes a recipient luminophoric medium, and generates a combined emission of a yellow/green color point with a 1931 CIE chromaticity diagram color point of (0.4494, 0.5161). A fourth LED string is driven by a cyan LED having a peak emission wavelength of approximately 505 nm, utilizes a recipient luminophoric medium, and generates a combined emission of a cyan color point with a 1931 CIE chromaticity diagram color point of (0.3548, 0.5484). Table 12 below shows the spectral power distributions for the blue, red, yellow-green, and cyan color points generated by the device of this Example, with spectral power shown within wavelength ranges in nanometers from 380 nm to 780 nm, with an arbitrary reference wavelength range selected for each color range and normalized to a value of 100.0:

TABLE 12

| | 380-420 | 421-460 | 461-500 | 501-540 | 541-580 | 581-620 | 621-660 | 661-700 | 701-740 | 741-780 |
|---|---|---|---|---|---|---|---|---|---|---|
| Blue | 1.9 | 100.0 | 34.4 | 32.1 | 40.5 | 29.0 | 15.4 | 5.9 | 2.8 | 1.5 |
| Red | 14.8 | 10.5 | 6.7 | 8.7 | 8.7 | 102.8 | 100.0 | 11.0 | 1.5 | 1.1 |
| Yellow-Green | 1.1 | 2.3 | 5.9 | 61.0 | 100.0 | 85.0 | 51.0 | 12.6 | 3.2 | 1.0 |
| Cyan | 0.7 | 1.6 | 39.6 | 100.0 | 80.4 | 53.0 | 24.9 | 9.5 | 3.3 | 1.2 |

Tables 13 and 14 show exemplary luminophoric mediums suitable for the recipient luminophoric mediums for the blue, red, yellow/green, and cyan channels of this Example, using the Compositions A-F from Implementation 1 or Implementation 2 as described in Tables 1 and 2 above.

TABLE 13

Volumetric Ratios - Using "Implementation 1"
Compositions from Tables 1 and 2

|  | Comp. A | Comp. B | Comp. C | Comp. D | Comp. E | Comp. F | Matrix |
|---|---|---|---|---|---|---|---|
| Blue Blend 1 |  | 1.49 | 0.13 |  |  |  | 98.38 |
| Blue Blend 2 |  | 1.46 |  |  | 0.15 |  | 98.39 |
| Blue Blend 3 | 1.63 |  | 1.12 |  |  |  | 97.24 |
| Blue Blend 4 | 1.36 | 0.53 | 0.71 |  |  |  | 97.41 |
| Blue Blend 5 |  |  | 1.24 | 1.34 |  |  | 97.43 |
| Blue Blend 6 |  | 0.75 | 0.84 | 1.04 |  |  | 97.37 |
| Blue Blend 7 | 0.99 |  |  |  | 1.27 |  | 97.74 |
| Red Blend 1 |  | 2.18 | 20.26 |  |  |  | 77.55 |
| Red Blend 2 |  | 0.40 |  |  | 13.83 | 5.57 | 80.20 |
| Red Blend 3 | 2.57 |  | 20.93 |  |  |  | 76.50 |
| Red Blend 4 | 0.68 | 2.15 | 22.07 |  |  |  | 75.10 |
| Red Blend 5 |  |  | 17.50 | 2.11 |  |  | 80.40 |
| Red Blend 6 |  | 1.62 | 20.45 | 0.85 |  |  | 77.07 |
| Red Blend 7 | 0.47 |  |  |  | 11.38 | 9.48 | 78.67 |
| Yellow/Green Blend 1 | 46.13 |  | 3.33 |  |  |  | 50.54 |
| Yellow/Green Blend 2 | 74.85 | 15.25 | 0.09 |  |  |  | 9.81 |
| Yellow/Green Blend 3 |  |  | 2.99 | 18.14 |  |  | 78.87 |
| Yellow/Green Blend 4 |  | 5.55 | 5.59 | 38.75 |  |  | 50.11 |
| Yellow/Green Blend 5 | 32.93 |  |  |  | 2.40 | 3.11 | 61.56 |
| Cyan Blend 1 |  | 12.31 | 8.97 |  |  |  | 78.72 |
| Cyan Blend 2 |  | 18.36 |  |  | 7.33 | 1.03 | 73.28 |
| Cyan Blend 3 | 17.39 |  | 14.53 |  |  |  | 68.08 |
| Cyan Blend 4 | 1.58 | 16.41 | 6.74 |  |  |  | 75.27 |
| Cyan Blend 5 |  |  | 4.42 | 6.30 |  |  | 89.28 |
| Cyan Blend 6 |  | 9.00 | 1.00 | 8.02 |  |  | 81.98 |
| Cyan Blend 7 | 25.77 |  |  |  | 11.28 | 8.70 | 54.26 |

TABLE 14

Volumetric Ratios - Using "Implementation 2"
Compositions from Tables 1 and 2

|  | Comp. A | Comp. B | Comp. C | Comp. D | Comp. E | Comp. F | Matrix |
|---|---|---|---|---|---|---|---|
| Blue Blend 8 |  | 1.06 |  |  |  |  | 98.94 |
| Blue Blend 9 | 0.76 |  | 1.45 |  |  |  | 97.79 |
| Blue Blend 10 | 0.08 | 0.12 | 1.52 |  |  |  | 98.28 |
| Red Blend 8 |  | 0.74 | 14.13 |  |  |  | 85.13 |
| Red Blend 9 | 0.6 |  | 14.65 |  |  |  | 84.75 |
| Red Blend 10 | 3.07 | 3.52 | 14.75 |  |  |  | 78.66 |
| Cyan Blend 8 |  | 6.31 | 1.13 |  |  |  | 92.56 |
| Cyan Blend 9 | 10.0 |  | 2.5 |  |  |  | 87.50 |

Example 5

A semiconductor light emitting device was simulated having four LED strings. A first LED string is driven by a blue LED having peak emission wavelength of approximately 450 nm to approximately 455 nm, utilizes a recipient luminophoric medium, and generates a combined emission of a blue color point with a 1931 CIE chromaticity diagram color point of (0.2524, 0.223). A second LED string is driven by a blue LED having peak emission wavelength of approximately 450 nm to approximately 455 nm, utilizes a recipient luminophoric medium, and generates a combined emission of a red color point with a 1931 CIE chromaticity diagram color point of (0.5941, 0.3215). A third LED string is driven by a blue LED having peak emission wavelength of approximately 450 nm to approximately 455 nm, utilizes a recipient luminophoric medium, and generates a combined emission of a yellow/green color point with a 1931 CIE chromaticity diagram color point of (0.4338, 0.5195). A fourth LED string is driven by a cyan LED having a peak emission wavelength of approximately 505 nm, utilizes a recipient luminophoric medium, and generates a combined emission of a cyan color point with a 1931 CIE chromaticity diagram color point of (0.3361, 0.5257). Table 15 below shows the spectral power distributions for the blue, red, yellow-green, and cyan color points generated by the device of this Example, with spectral power shown within wavelength ranges in nanometers from 380 nm to 780 nm, with an arbitrary reference wavelength range selected for each color range and normalized to a value of 100.0:

TABLE 15

| | 380-420 | 421-460 | 461-500 | 501-540 | 541-580 | 581-620 | 621-660 | 661-700 | 701-740 | 741-780 |
|---|---|---|---|---|---|---|---|---|---|---|
| Blue | 1.9 | 100.0 | 34.4 | 32.1 | 40.5 | 29.0 | 15.4 | 5.9 | 2.8 | 1.5 |
| Red | 0.2 | 8.5 | 3.0 | 5.5 | 9.5 | 60.7 | 100.0 | 1.8 | 0.5 | 0.3 |

TABLE 15-continued

|  | 380-420 | 421-460 | 461-500 | 501-540 | 541-580 | 581-620 | 621-660 | 661-700 | 701-740 | 741-780 |
|---|---|---|---|---|---|---|---|---|---|---|
| Yellow-Green | 0.8 | 5.6 | 6.3 | 73.4 | 100.0 | 83.8 | 48.4 | 19.5 | 6.5 | 2.0 |
| Cyan | 0.2 | 1.4 | 58.6 | 100.0 | 62.0 | 47.5 | 28.2 | 6.6 | 1.8 | 0.6 |

Tables 16 and 17 show exemplary luminophoric mediums suitable for the recipient luminophoric mediums for the blue, red, yellow/green, and cyan channels of this Example, using the Compositions A-F from Implementation 1 or Implementation 2 as described in Tables 1 and 2 above.

TABLE 16

Volumetric Ratios - Using "Implementation 1"
Compositions from Tables 1 and 2

|  | Comp. A | Comp. B | Comp. C | Comp. D | Comp. E | Comp. F | Matrix |
|---|---|---|---|---|---|---|---|
| Blue Blend 1 |  | 2.29 |  |  |  |  | 97.70 |
| Blue Blend 2 |  | 2.46 |  |  | 0.15 |  | 97.39 |
| Blue Blend 3 | 3.01 |  | 0.99 |  |  |  | 95.99 |
| Blue Blend 4 | 2.34 | 1.01 | 0.29 |  |  |  | 96.35 |
| Blue Blend 5 |  |  | 1.25 | 2.20 |  |  | 96.55 |
| Blue Blend 6 |  | 1.25 | 0.60 | 2.09 |  |  | 96.06 |
| Blue Blend 7 | 1.88 |  |  |  | 1.16 |  | 96.96 |
| Red Blend 1 |  | 2.12 | 26.06 |  |  |  | 71.82 |
| Red Blend 2 |  | 0.24 |  |  | 16.36 | 9.03 | 74.37 |
| Red Blend 3 | 2.43 |  | 26.68 |  |  |  | 70.89 |
| Red Blend 4 | 1.02 | 1.64 | 28.61 |  |  |  | 68.72 |
| Red Blend 5 |  |  | 22.60 | 2.22 |  |  | 75.19 |
| Red Blend 6 |  | 1.11 | 26.37 | 1.45 |  |  | 71.07 |
| Red Blend 7 | 0.38 |  |  |  | 13.79 | 12.99 | 72.84 |
| Yellow/Green Blend 1 | 42.76 |  | 1.82 |  |  |  | 55.43 |
| Yellow/Green Blend 2 | 44.06 | 3.54 | 0.05 |  |  |  | 52.35 |
| Yellow/Green Blend 3 |  |  | 2.60 | 16.60 |  |  | 80.80 |
| Yellow/Green Blend 4 |  | 3.59 | 4.91 | 38.01 |  |  | 53.50 |
| Yellow/Green Blend 5 | 30.44 |  |  |  | 1.49 | 1.87 | 66.20 |
| Cyan Blend 1 |  | 1.51 | 11.87 |  |  |  | 86.62 |
| Cyan Blend 2 |  | 2.55 |  |  | 10.92 | 9.29 | 77.25 |
| Cyan Blend 3 | 2.06 |  | 12.75 |  |  |  | 85.19 |
| Cyan Blend 4 |  | 3.42 | 10.40 |  |  |  | 86.17 |
| Cyan Blend 5 |  |  | 8.17 | 2.54 |  |  | 89.29 |
| Cyan Blend 6 |  | 0.63 | 1.67 | 8.85 |  |  | 88.85 |
| Cyan Blend 7 | 4.97 |  |  |  | 12.58 | 10.32 | 72.12 |

TABLE 17

Volumetric Ratios - Using "Implementation 2"
Compositions from Tables 1 and 2

|  | Comp. A | Comp. B | Comp. C | Comp. D | Comp. E | Comp. F | Matrix |
|---|---|---|---|---|---|---|---|
| Blue Blend 8 |  | 1.42 | 0.03 |  |  |  | 98.55 |
| Blue Blend 9 | 1.25 |  | 1.2 |  |  |  | 97.55 |
| Blue Blend 10 | 0.135 | 0.135 | 1.080 |  |  |  | 98.65 |
| Red Blend 8 |  | 0.74 | 17.04 |  |  |  | 82.22 |
| Red Blend 9 | 0.58 |  | 17.52 |  |  |  | 81.90 |
| Red Blend 10 | 2.3 | 3.97 | 18.94 |  |  |  | 74.79 |
| Cyan Blend 8 |  | 2.01 | 5.38 |  |  |  | 92.61 |
| Cyan Blend 9 | 3.65 |  | 5.55 |  |  |  | 90.80 |

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

What is claimed:

1. A method of generating white light, the method comprising
passing light from a first LED string through a first luminophoric medium comprised of one or more luminescent materials and matrix in a first ratio for a first combined light in a blue color range on 1931 CIE diagram;
passing light from a second LED string through a second luminophoric medium comprised of one or more luminescent materials and matrix in a second ratio for a second combined light in a red color range on 1931 CIE diagram, wherein a spectral power distribution for the second combined light in the red color range is 100% for wavelengths between 621 nm to 660 nm and between 1.8% to 74.3% for wavelengths between 661 nm to 700 nm,
passing light from a third LED string through a third luminophoric medium comprised of one or more luminescent materials and matrix in a third ratio for a third combined light in a yellow/green color range on 1931 CIE diagram;
passing light from a fourth LED string through a fourth luminophoric medium comprised of one or more luminescent materials and matrix in a fourth ratio for a fourth combined light in a cyan color range on 1931 CIE diagram; and,
mixing the first, second, third, and fourth combined light together;
wherein the luminescent materials within each of the first, second, third, and fourth luminophoric mediums comprise one or more of a first type of luminescent material that emits light at a peak emission between about 515 nm and 590 nm in response to the associated LED string emission, and one or more of a second type of luminescent material that emits light at a peak emission between about 590 nm and about 700 nm in response to the associated LED string emission, the one or more of the first type of luminescent materials comprise $BaMgAl_{10}O_{17}$:Eu, $Lu_3Al_5O_{12}$:Ce, $(La,Y)_3Si_6N_{11}$:Ce, or $Y_3Al_5O_{12}$:Ce, and the one or more of the second type of luminescent materials comprise $CaAlSiN_3$:Eu, $(Sr,Ca)AlSiN_3$, or a semiconductor quantum dot.

2. The method of claim 1, wherein
the blue color range comprises one of regions 301A, 301B, or 301C, wherein 301A is a first region defined by a line connecting an infinity point of a Planckian locus, the Planckian locus from 4000K and infinite CCT, and a constant CCT line of 4000 k, a line of purples, and a spectral locus, 301B is a second region defined by a 60-step MacAdam ellipse at a 20,000K CCT located 40 points below the Planckian locus, 301C is a third region defined by a quadrilateral with a center point located at (0.25, 0.20),
the red color range comprises one of regions 302A, 302B, or 302C, wherein 302A is a fourth region defined by the spectral locus between a constant CCT line of 1600K and the line of purples, the line of purples, a line connecting a pair of color coordinates located at (0.61, 0.21) and (0.47, 0.28), and the constant CCT line of 1600K, 302B is a fifth region defined by a 20-step MacAdam ellipse at a 1200K CCT located 20 points below the Planckian locus, and 302C is a sixth region defined by a quadrilateral with a center point located at (0.58, 0.35),
the yellow/green color range comprises one of regions 303A, 303B, or 303C wherein 303A is a seventh region defined by a constant CCT line of 4600K, the Planckian locus between 4600K and 550K, the spectral locus, and a line connecting a pair of color coordinates located at (0.445, 0.555) and (0.38, 0.505), 303B is an eight region defined by a 16-step MacAdam ellipse at a 3700 CCT located 30 points above the Planckian locus, and 303C is a ninth region defined by a quadrilateral with a center point located at (0.45, 0.475), and
the cyan color range comprises one of regions 304A, 304B, or 304C, wherein 304A is a tenth region defined by a line connecting a pair of color coordinates located at (0.18, 0.55) and (0.27, 0.72), a constant CCT line of 9000K, the Planckian locus between 9000K and 4600K, a constant CCT line of 4600K, and the spectral locus, 304B is an eleventh region defined by a 30-step MacAdam ellipse at a 6000K CCT located 68 points above the Planckian locus, and 304C is a twelfth region defined by a quadrilateral with a center point located at (0.35, 0.52).

3. The method of claim 1, wherein the first luminophoric medium comprises about 80% to about 99% by volume of the matrix.

4. The method of claim 1, wherein the first luminophoric medium comprises about 93% to about 99% by volume of the matrix.

5. The method of claim 1, wherein the second luminophoric medium comprises about 45% to about 90% by volume of the matrix.

6. The method of claim 1, wherein the third luminophoric medium comprises about 1% to about 90% by volume of the matrix.

7. The method of claim 1, wherein the third luminophoric medium comprises about 9% to about 90% by volume of the matrix.

8. The method of claim 1, wherein the fourth luminophoric medium comprises about 54% to about 97% by volume of the matrix.

9. The method of claim 1, wherein the fourth luminophoric medium comprises about 87% to about 97% by volume of the matrix.

10. The method of claim 1, wherein the third luminophoric medium comprises up to about 99% by volume of $Lu_3Al_5O_{12}$:Ce.

11. The method of claim 1, wherein the fourth luminophoric medium comprises up to about 30% by volume of $Lu_3Al_5O_{12}$:Ce.

12. The method of claim 1, wherein the first luminophoric medium comprises up to about 7.5% by volume of $BaMgAl_{10}O_{17}$:Eu.

13. The method of claim 1, wherein the second luminophoric medium comprises up to about 15% by volume of $BaMgAl_{10}O_{17}$:Eu.

14. The method of claim 1, wherein the third luminophoric medium comprises up to about 85% by volume of $BaMgAl_{10}O_{17}$:Eu.

15. The method of claim 1, wherein the fourth luminophoric medium comprises up to about 10% by volume of $BaMgAl_{10}O_{17}$:Eu.

16. The method of claim 1, wherein the first luminophoric medium comprises up to about 5% by volume of $CaAlSiN_3$.

17. The method of claim 1, wherein the second luminophoric medium comprises up to about 55% by volume of $CaAlSiN_3$.

18. The method of claim 1, wherein the spectral power distribution of the first combined light has a spectral power distribution intensity of between 0.3 and 8.1 for the wavelength range of 380-420 nm, between 20.9 and 196.1 for the wavelength range of 461-500 nm, between 15.2 and 35.6 for the wavelength range of 501-540 nm, between 25.3 and 40.5 for the wavelength range of 541-580 nm, between 26.3 and 70 for the wavelength range of 581-620 nm, between 15.4 and 80.2 for the wavelength range of 621-660 nm, between 5.9 and 20.4 for the wavelength range of 661-700 nm, between 2.3 and 7.8 for the wavelength range of 701-740 nm, and between 1.0 and 2.3 for the wavelength range of 741-780 nm, relative to a value of 100.0 for the wavelength range of 421-460 nm, wherein a spectral power distribution for the second combined light in the red color range is between 0.0% to 14.8% for wavelengths between 380 nm to 420 nm, between 2.1% to 15% for wavelengths between 421 nm to 460 nm, between 2.0% to 6.7% for wavelengths between 461 nm to 500 nm, between 1.4% to 12.2% for wavelengths between 501 nm to 540 nm, between 8.7% to 20.5% for wavelengths between 541 nm to 580 nm, between 48.5% and 102.8% for wavelengths between 581 nm to 620 nm, 100% for wavelengths between 621 nm to 660 nm, between 1.8% to 74.3% for wavelengths between 661 nm to 700 nm, between 0.5% to 29.5% for wavelengths between 701 nm to 740 nm, and between 0.3% to 9.0% for wavelengths between 741 nm to 780 nm, wherein the spectral power distribution of the third combined light has a spectral power distribution intensity of between 0.0 and 1.1 for the wavelength range of 380-420 nm, between 1.0 and 25.3 for the wavelength range of 421-460 nm, between 4.2 and 52.7 for the wavelength range of 461-500 nm, between 56.6 and 77.5 for the wavelength range of 501-540 nm, between 80.5 and 123.4 for the wavelength range of 581-620 nm, between 48.4 and 144.9 for the wavelength range of 621-660 nm, between 12.6 and 88.8 for the wavelength range of 661-700 nm, between 3.2 and 34.4 for the wavelength range of 701-740 nm, and between 1.0 and 10.5 for the wavelength range of 741-780 nm, relative to a value of 100.0 for the wavelength range of 541-580 nm, and wherein the spectral power distribution of the fourth combined light has a spectral power distribution of between 0.1 and 0.7 for the wavelength range of 380-420 nm, between 0.5 and 1.6 for the wavelength range of 421-460 nm, between 39.6 and 58.6 for the wavelength range of 461-500 nm, between 62.0 and 80.4 for the wavelength range of 541-580 nm, between 41.6 and 59.9 for the wavelength range of 581-620 nm, between 23.1 and 57.1 for the wavelength range of 621-660 nm, between 6.6 and 35.0 for the wavelength range of 661-700 nm, between 1.8 and 13.5 for the wavelength range of 701-740 nm, between 0.6 and 4.1 for the wavelength range of 741-780 nm, relative to a value of 100.0 for the wavelength range of 501-540 nm.

\* \* \* \* \*